(12) United States Patent
Liu et al.

(10) Patent No.: US 12,199,794 B2
(45) Date of Patent: Jan. 14, 2025

(54) PACKET SENDING METHOD, APPARATUS, AND SYSTEM

(71) Applicant: HUAWEI TECHNOLOGIES CO., LTD., Guangdong (CN)

(72) Inventors: Bing Liu, Beijing (CN); Shuping Peng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/732,668

(22) Filed: Apr. 29, 2022

(65) Prior Publication Data

US 2022/0255772 A1  Aug. 11, 2022

Related U.S. Application Data

(63) Continuation of application No. PCT/CN2020/125286, filed on Oct. 30, 2020.

(30) Foreign Application Priority Data

Oct. 31, 2019 (CN) .......................... 201911051664.X

(51) Int. Cl.
*H04L 12/46* (2006.01)
(52) U.S. Cl.
CPC ................. *H04L 12/4633* (2013.01)
(58) Field of Classification Search
CPC ..... H04L 12/4633; H04L 45/34; H04L 45/50; H04L 12/4641; H04L 45/04;
(Continued)

(56) References Cited

U.S. PATENT DOCUMENTS

| 2014/0086253 | A1 | 3/2014 | Yong |
| 2017/0063783 | A1* | 3/2017 | Yong ...................... H04L 69/22 |
| 2018/0026884 | A1 | 1/2018 | Nainar et al. |

FOREIGN PATENT DOCUMENTS

| CN | 105471738 A | 4/2016 |
| CN | 106992917 A | 7/2017 |

(Continued)

OTHER PUBLICATIONS

Mao Jianwei, Optimized Design and Implementation of SDN-Based Segment Routing Network, Beijing University of Posts and Telecommunications, 2019, Issue 09, 2 pages (abstract).

(Continued)

*Primary Examiner* — Charles C Jiang
*Assistant Examiner* — Rachel Elizabeth Marks

(57) ABSTRACT

A packet sending method, apparatus, and system are disclosed, and related to the communications field. The method includes: A first device receives a first packet including a network identifier of a virtual local area network and an original packet. The first device obtains a first identifier based on an identifier of the second host and the network identifier, where the first identifier is used to identify a second device, a segment routing over internet protocol version 6 (SRv6) tunnel exists between the first device and the second device, the first identifier includes an indication identifier used to indicate the second device to convert a format of a packet forwarded through the SRv6 tunnel into a format of a packet forwarded through a first network virtualization over layer 3 (NVO3) tunnel. The first device sends an SRv6 packet including the first identifier and the original packet to the second device through the SRv6 tunnel.

20 Claims, 18 Drawing Sheets

(58) Field of Classification Search
CPC . H04L 2101/622; H04L 61/58; H04L 61/103; H04L 45/02; H04L 47/825; H04L 2212/00
See application file for complete search history.

(56) References Cited

FOREIGN PATENT DOCUMENTS

| | | | |
|---|---|---|---|
| CN | 107395508 | A | 11/2017 |
| CN | 108011837 | A | 5/2018 |
| CN | 109861924 | A | 6/2019 |
| CN | 109861926 | A | 6/2019 |
| EP | 3133778 | A1 | 2/2017 |
| EP | 3424183 | B1 | 11/2019 |
| WO | 2015180120 | A1 | 12/2015 |
| WO | 2019011114 | A1 | 1/2019 |
| WO | 2019105066 | A1 | 6/2019 |

OTHER PUBLICATIONS

W. Hao et al, Inter-AS Option C between NVO3 and BGP/MPLS IP VPN network; draft-hao-bess-inter-nvo3-vpn-optionc-03.txt, 2015, 16 pages.
V. Fuller et al., Locator/ID Separation Protocol (LISP) Control-Plane; draft-ietf-lisp-rfc6833bis-15, Network Working Group, Sep. 18, 2018, 50 pages.
Office Action issued in CN201911051664.X, dated Aug. 18, 2021, 7 pages.
International Search Report and Written Opinion issued in PCT/CN2020/125286, dated Jan. 29, 2021, 9 pages.
Extended European Search Report issued in EP20883326.9, dated Sep. 28, 2022, 11 pages.
Communication pursuant to Article 94(3) EPC issued in EP20883326.9, dated Oct. 11, 2023, 9 pages.

\* cited by examiner

PACKET SENDING METHOD, APPARATUS, AND SYSTEM

CROSS-REFERENCE TO RELATED APPLICATIONS

This application is a continuation of International Application No. PCT/CN2020/125286, filed on Oct. 30, 2020, which claims priority to Chinese Patent Application No. 201911051664.X, filed on Oct. 31, 2019. The disclosures of the aforementioned applications are hereby incorporated by reference in their entireties.

TECHNICAL FIELD

This application relates to the communications field, and in particular, to a packet sending method, apparatus, and system.

BACKGROUND

Users (the users are devices or virtual machines) in a same virtual local area network may be distributed in different physical local area networks. The physical local area networks may be connected to a wide area network, so that two users who belong to the same virtual local area network but are located in different physical local area networks communicate with each other through the wide area network.

For ease of description, the two users are a first user and a second user. A first physical local area network in which the first user is located is connected to a first edge router (PE) in the wide area network through a first gateway, and a second physical local area network in which the second user is located is connected to a second PE in the wide area network through a second gateway. A first network virtualization over layer 3 (NVO3) tunnel is established between a first router connected to the first user in the first physical local area network and the first PE. A second NVO3 tunnel is established between a second router connected to the second user in the second physical local area network and the second PE. A multi-protocol label switching (MPLS) tunnel is established between the first PE and the second PE. A mapping relationship between a virtual extensible local area network identifier (VNI) used to identify the virtual local area network and an MPLS label used to identify the virtual local area network is stored in both the first PE and the second PE.

In this way, when the first user sends a first packet to the second user, the first router receives the first packet, adds a header corresponding to the first NVO3 tunnel to the first packet to obtain a second packet, and sends the second packet to the first PE through the first NVO3 tunnel, where the header includes the VNI used to identify the virtual local area network. The first PE receives the second packet, obtains the MPLS label corresponding to the VNI included in the second packet, removes the header added to the second packet to obtain the first packet, adds an MPLS header to the first packet to obtain a third packet, and sends the third packet to the second PE, where the MPLS header includes the MPLS label used to identify the virtual local area network. The second PE receives the third packet, obtains the VNI corresponding to the MPLS label in the third packet, removes the MPLS header from the third packet to obtain the first packet, adds a header corresponding to the second NVO3 tunnel corresponding to the VNI to the first packet to obtain a fourth packet, and sends the fourth packet to the second router through the second NVO3 tunnel corresponding to the VNI, where the header includes the VNI. The second router receives the fourth packet, and removes the header corresponding to the second NVO3 tunnel from the fourth packet to obtain the first packet, and then the second router sends the first packet to the second user.

In a process of implementing this application, the inventor finds that the related technology has at least the following problems:

Currently, a length of the VNI for the virtual local area network is 24 bits, and an effective length of the MPLS label is 20 bits. Therefore, the length of the VNI is greater than that of the MPLS label, and a quantity M of virtual local area networks that can be identified by the VNI is greater than a quantity N of virtual local area networks that can be identified by the MPLS label. When all the MPLS labels are used for the N virtual local area networks, there are no MPLS labels that can be used for other virtual local area networks. As a result, users who are located in the virtual local area network but in different physical local area networks cannot communicate with each other.

SUMMARY

This application provides a packet sending method, apparatus, and system, to ensure normal communication between hosts located in a same virtual local area network but in different physical local area networks. Example embodiments of the technical solutions are as follows:

According to a first aspect, an embodiment of this application provides a packet sending method. In the method, a first device receives a first packet, where the first packet includes a network identifier of a virtual local area network and an original packet, the original packet is a packet sent by a first host to a second host, and the virtual local area network includes the first host and a second host. The first device obtains a first identifier based on an identifier of the second host and the network identifier, where the first identifier is used to identify a second device, a segment routing over internet protocol version 6 (SRv6) tunnel exists between the first device and the second device, the first device is an ingress device for the SRv6 tunnel, a first network virtualization over layer 3 (NVO3) tunnel exists between the second device and a network device accessed by the second host, the first identifier includes an indication identifier, and the indication identifier is used to indicate the second device to convert a format of a packet forwarded through the SRv6 tunnel into a format of a packet forwarded through the first NVO3 tunnel. The first device sends an SRv6 packet to the second device through the SRv6 tunnel, where the SRv6 packet includes the first identifier and the original packet.

In an SRv6 network, a length of the first identifier used to identify the second device is usually 128 bits, and is longer than a length of an MPLS label. Therefore, a quantity of virtual local area networks that can be identified by the first identifier is not less than a quantity of virtual local area networks that can be identified by a VNI. This avoids a technical problem that users in some virtual local area networks but in different virtual local area networks cannot perform communication because there are no available MPLS labels for the virtual local area networks, and can ensure normal communication between hosts located in a same virtual local area network but in different physical local area networks.

In an example embodiment, the first device obtains a device identifier of the second device based on the identifier of the second host and the network identifier. The first device obtains the first identifier from a mapping relationship table based on the network identifier and the device identifier, where the mapping relationship table is used to store a correspondence between a network identifier, a device identifier, and the first identifier. In this way, after receiving the first packet, the first device can accurately obtain the first identifier, and the first device can send the SRv6 packet along with the first identifier to the second device.

In another example embodiment, the first identifier is further used to identify the network device accessed by the second host. The first device obtains a device identifier of the second device based on the identifier of the second host and the network identifier. The first device obtains the first identifier from a mapping relationship table based on the network identifier and the device identifier, where the mapping relationship table is used to store a correspondence between a network identifier, a device identifier, an identifier of a host, and the first identifier.

In another example embodiment, the SRv6 packet further includes first metadata. The first device obtains the first metadata, where the first metadata includes at least one of additional information of the original packet or device information of a network device through which the original packet passes.

In another example embodiment, the first packet further includes second metadata. The first device converts a format of the second metadata based on a protocol type corresponding to a second NVO3 tunnel and a field type of the second metadata included in the first packet, to obtain the first metadata, where the second NVO3 tunnel is a tunnel between the first device and a network device accessed by the first host. In this way, metadata in the first packet can be transmitted to the second host, to avoid metadata loss.

In another example embodiment, a segment list field in the SRv6 packet includes the first identifier.

In another example embodiment, the first identifier is a segment identifier (SID). A length of the SID is relatively long, so that the second device can distinguish all existing virtual local area networks based on the first identifier.

In another example embodiment, the first device receives a notification packet sent by the second device, where the notification packet includes the first identifier, the network identifier, and the device identifier. The first device stores a correspondence between the first identifier, the network identifier, and the device identifier in the mapping relationship table, so that the first device can obtain the first identifier when receiving the first packet from the first host, to implement communication between the first device and the second host based on the first identifier.

In another example embodiment, the second device is an edge router (PE), a gateway (GW), a co-located device, a spine switch (Spine), or a leaf switch (TOR) connected to the second host, and the co-located device includes a function of the PE and a function of the GW. When the second device is the GW, the co-located device, the spine, or the TOR, the NVO3 tunnel between the second device and the network device accessed by the second host includes one tunnel segment. This can reduce a quantity of times for converting formats of packets between different tunnels.

In another example embodiment, the first device is a PE, a GW, a co-located device, a spine, or a TOR connected to the first host, and the co-located device includes a function of the PE and a function of the GW. When the first device is the GW, the co-located device, the spine, or the TOR, the NVO3 tunnel between the first device and the network device accessed by the first host includes one tunnel segment. This can reduce a quantity of times for converting formats of packets between different tunnels.

According to a second aspect, an embodiment of this application provides a packet sending method. In the method, a second device receives an SRv6 packet through a segment routing over internet protocol version 6 (SRv6) tunnel between the second device and a first device, where the first device is an ingress device for the SRv6 tunnel, the SRv6 packet includes a first identifier and an original packet, the original packet is a packet sent by a first host to a second host, the first identifier is used to identify the second device, a first network virtualization over layer 3 (NVO3) tunnel exists between the second device and a network device accessed by the second host, and the first identifier includes an indication identifier. The second device converts the SRv6 packet into a second packet based on the first identifier, where the second packet includes a network identifier of a virtual local area network and the original packet, and the virtual local area network includes the first host and the second host. The second device sends the second packet to the second host through the first NVO3 tunnel.

In an SRv6 network, a length of the first identifier used to identify the second device is usually 128 bits, and is longer than a length of an MPLS label. Therefore, a quantity of virtual local area networks that can be identified by the first identifier is not less than a quantity of virtual local area networks that can be identified by a VNI. This avoids a technical problem that users in some virtual local area networks but in different virtual local area networks cannot perform communication because there are no available MPLS labels for the virtual local area networks, and can ensure normal communication between hosts located in a same virtual local area network but in different physical local area networks.

In an example embodiment, the second device obtains the network identifier of the virtual local area network and an encapsulation type of the first NVO3 tunnel from a mapping relationship table based on the first identifier, where the mapping relationship table is used to store a correspondence between the first identifier, a network identifier, and an encapsulation type. The second device converts a format of the SRv6 packet based on the network identifier of the virtual local area network and the encapsulation type, to obtain the second packet. The mapping relationship table is used to store the correspondence between the first identifier, the network identifier, and the encapsulation type. Therefore, the second network device determines, based on the first identifier, the virtual local area network in which the second host is located, and converts the format of the SRv6 packet into a packet format of the second packet corresponding to the first NVO3 tunnel.

In another example embodiment, the SRv6 packet further includes first metadata, the first metadata includes at least one of additional information of the original packet or device information of a network device through which the original packet passes, and the second packet further includes third metadata. The second device converts a format of the first metadata based on a protocol type corresponding to the first NVO3 tunnel and a field type of the first metadata included in the SRv6 packet, to obtain the third metadata. In this way, metadata in the SRv6 packet can be transmitted to the second host, to avoid metadata loss.

In another example embodiment, the first identifier is further used to identify the network device accessed by the second host, and the second packet further includes a device identifier of the network device accessed by the second host. In this way, the device identifier of the network device may be obtained based on the first identifier, to avoid a case in which the second device obtains the identifier of the network device again, and improve packet sending efficiency.

In another example embodiment, the first identifier is a segment identifier (SID). A length of the SID is relatively long, so that the second device can distinguish all existing virtual local area networks based on the first identifier.

In another example embodiment, the second device sends a notification packet to the first device, where the notification packet includes the first identifier, the device identifier of the second device, and the network identifier of the virtual local area network. In this way, the first device stores the first identifier.

In another example embodiment, the second device is an edge router (PE), a gateway (GW), a co-located device, a spine switch (Spine), or a leaf switch (TOR) connected to the second host, and the co-located device includes a function of the PE and a function of the GW. When the second device is the GW, the co-located device, the spine, or the TOR, the NVO3 tunnel between the second device and the network device accessed by the second host includes one tunnel segment. This can reduce a quantity of times for converting formats of packets between different tunnels.

In another example embodiment, the first device is a PE, a GW, a co-located device, a spine, or a TOR connected to the first host, and the co-located device includes a function of the PE and a function of the GW. When the first device is the GW, the co-located device, the spine, or the TOR, the NVO3 tunnel between the first device and the network device accessed by the first host includes one tunnel segment. This can reduce a quantity of times for converting formats of packets between different tunnels.

According to a third aspect, an embodiment of this application provides a packet sending method. In the method, a first device receives a notification packet sent by a second device, where the notification packet includes a first identifier, a network identifier of a virtual local area network, and a device identifier of the second device, the first identifier is used to identify the second device, the first identifier includes an indication identifier, the indication identifier is used to indicate the second device to convert a format of a packet forwarded through an SRv6 tunnel into a format of a packet forwarded through a first NVO3 tunnel, the SRv6 tunnel is an SRv6 tunnel between the first device and the second device, the first NVO3 tunnel is a tunnel between the second device and a network device accessed by the second host, and the second host belongs to the virtual local area network. The first device stores a correspondence between the first identifier, a network identifier, and a device identifier in a mapping relationship table. In this way, the first device can obtain the first identifier from the mapping relationship table when receiving a first packet from a first host, and send the first packet to the second host based on the first identifier.

According to a fourth aspect, an embodiment of this application provides a packet sending method. In the method, a second device receives routing information, where the routing information includes a network identifier of a virtual local area network to which a second host belongs. The second device obtains a first identifier, where the first identifier is used to identify the second device, the first identifier includes an indication identifier, the indication identifier is used to indicate the second device to convert a format of a packet forwarded through an SRv6 tunnel into a format of a packet forwarded through a first NVO3 tunnel, the SRv6 tunnel is an SRv6 tunnel between a first device and the second device, and the first NVO3 tunnel is a tunnel between the second device and a network device accessed by the second host. The second device sends a notification packet to the first device, where the notification packet includes the first identifier, a device identifier of the second device, and the network identifier of the virtual local area network. In this way, the first device stores the first identifier, and when receiving a first packet from a first host, the first device sends the first packet to the second host based on the first identifier.

According to a fifth aspect, an embodiment of this application provides a packet sending apparatus, configured to perform the method according to any one of the first aspect or the example embodiments of the first aspect. Specifically, the apparatus includes units configured to perform the method according to any one of the first aspect or the example embodiments of the first aspect. Alternatively, the apparatus includes a unit configured to perform the method according to the third aspect.

According to a sixth aspect, an embodiment of this application provides a packet sending apparatus, configured to perform the method according to any one of the second aspect or the example embodiments of the second aspect. Specifically, the apparatus includes units configured to perform the method according to the second aspect or any example embodiment of the second aspect. Alternatively, the apparatus includes a unit configured to perform the method according to the fourth aspect.

According to a seventh aspect, an embodiment of this application provides a packet sending apparatus. The apparatus includes a processor, a memory, and a transceiver. The processor, the memory, and the transceiver may be connected by using a bus system. The memory is configured to store one or more programs. The processor is configured to execute the one or more programs in the memory to complete the method according to any one of the first aspect or the example embodiments of the first aspect, or the processor is configured to execute the one or more programs in the memory, to complete the method according to the third aspect.

According to an eighth aspect, an embodiment of this application provides a packet sending apparatus. The apparatus includes a processor, a memory, and a transceiver. The processor, the memory, and the transceiver may be connected by using a bus system. The memory is configured to store one or more programs. The processor is configured to execute the one or more programs in the memory to complete the method according to any one of the second aspect or the example embodiments of the second aspect, or the processor is configured to execute the one or more programs in the memory, to complete the method according to the third aspect.

According to a ninth aspect, an embodiment of this application provides a computer-readable storage medium. The computer-readable storage medium stores program code. When the program code is run on a computer, the computer is enabled to perform the method according to the first aspect, the second aspect, the third aspect, the fourth aspect, any example embodiments of the first aspect, or any example embodiments of the second aspect.

According to a tenth aspect, an embodiment of this application provides a computer program product including program code. When the computer program product runs on a computer, the computer is enabled to perform the method according to the first aspect, the second aspect, the third aspect, the fourth aspect, any example embodiment of the first aspect, or any example embodiment of the second aspect.

According to an eleventh aspect, an embodiment of this application provides a packet sending system, including the apparatus according to the fifth aspect and the apparatus according to the sixth aspect, or the apparatus according to the seventh aspect and the apparatus according to the eighth aspect.

DESCRIPTION OF EMBODIMENTS

Hosts in a virtual local area network may be distributed in different physical local area networks, and the hosts may be terminal devices, servers, virtual machines located on servers, or the like. The physical local area networks may be connected to a wide area network, so that two hosts in the same virtual local area network but in the different physical local area networks can communicate with each other through the wide area network.

Optionally, the physical local area network is a data center network or a local area network deployed in a campus.

Figure 1:
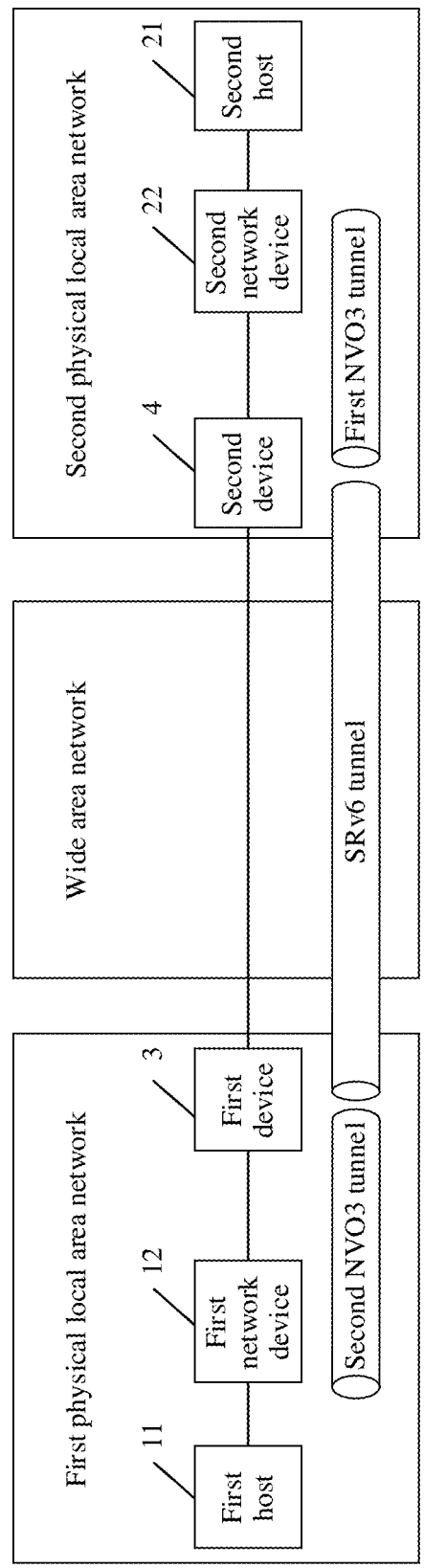
FIG. 1 is a schematic diagram of an example network architecture according to an embodiment of this application.

As shown in FIG. 1, it is assumed that a first host and a second host are located in a same virtual local area network, but the first host and the second host are located in a first physical local area network and a second physical local area network respectively. The first host accesses a network device located in the first physical local area network. For ease of description, the network device is referred to as a first network device. The second host accesses a network device located in the second physical local area network. For ease of description, the network device is referred to as a second network device.

Assuming that the first host needs to send a packet to the second host, a first NVO3 tunnel may be established between a second device and the second network device, and a segment routing over internet protocol version 6 (SRv6) tunnel may be established between a first device and the second device, and a second NVO3 tunnel may be established between the first network device and the first device, where the SRv6 tunnel traverses through an entire wide area network.

The first network device is an ingress device for the second NVO3 tunnel, the first device is an egress device for the second NVO3, and a transmission direction of the second NVO3 tunnel is a transmission direction from the first network device to the first device. The first device is an ingress device for the SRv6 tunnel, the second device is an egress device for the SRv6 tunnel, and a transmission direction of the SRv6 tunnel is a transmission direction from the first device to the second device. The second device is an ingress device for the first NVO3 tunnel, the second network device is an egress device for the first NVO3 tunnel, and a transmission direction of the first NVO3 tunnel is a transmission direction from the second device to the second network device.

The first device may be located in the first physical local area network and/or located in the wide area network, and the second device may be located in the second physical local area network and/or located in the wide area network. The first device may convert a format of a packet forwarded through the second NVO3 tunnel into a format of a packet forwarded through the SRv6 tunnel. The second device may convert a format of a packet forwarded through the SRv6 tunnel into a format of a packet forwarded through the first NVO3 tunnel.

In this case, although the first host is located in the first physical local area network, and the second host is located in the second physical local area network, the first host can send the packet to the second host through the second NVO3 tunnel, the SRv6 tunnel, and the first NVO3 tunnel. For a detailed implementation process in which the first host sends the packet to the second host, refer to the embodiments described with reference to the figures.

Alternatively, the second host may send a packet to the first host. A process in which the second host sends the packet is reverse to the process in which the first host sends the packet to the second host. Therefore, in the embodiments of this application, only the process in which the first host sends the packet to the second host is used as an example for description. For the process in which the second host sends the packet to the first host, refer to the process in which the first host sends the packet to the second host.

Optionally, a topology of a network architecture shown in FIG. 1 may include a plurality of structures. The following enumerates the following several network topology structures as examples.

Figure 2:
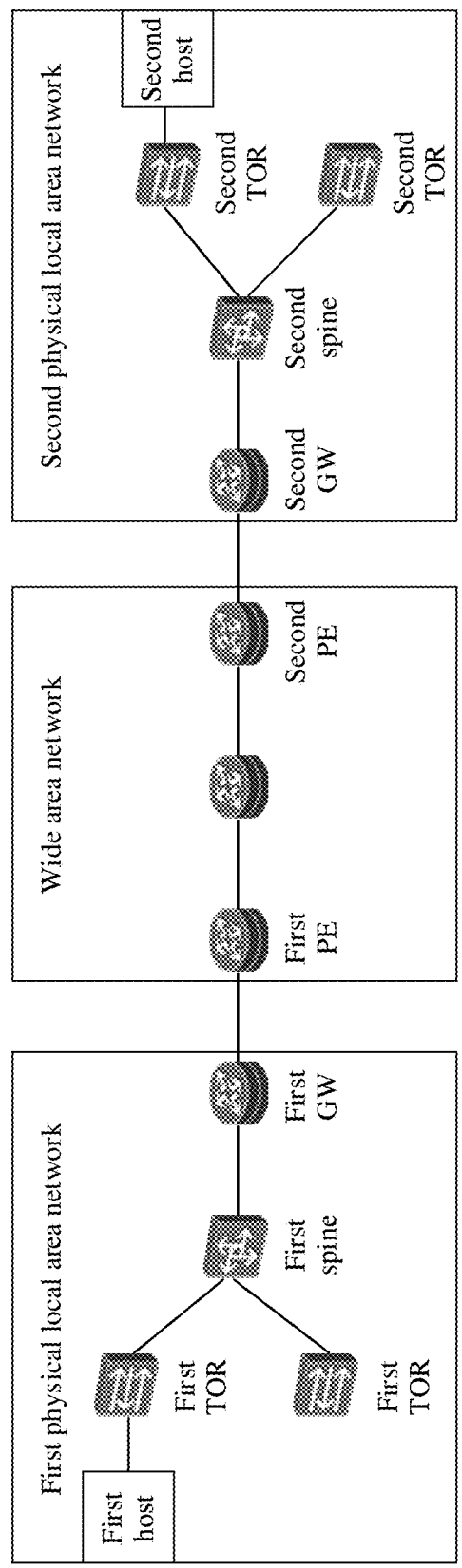
FIG. 2 is a schematic diagram of another example network architecture according to an embodiment of this application.

For a first network architecture, refer to FIG. 2. A topology of a first physical local area network may be the same as a topology of a second physical local area network. The first physical local area network includes a first spine switch (Spine), a first gateway (GW), at least one first leaf switch (top of rack, TOR), and the like. The second physical local area network includes a second spine, a second GW, at least one second TOR, and the like. In the first physical local area network, each first TOR may be connected to the first spine, the first spine is connected to the first GW, and the first GW is connected to a first PE in a wide area network, so that the first physical local area network is connected to the wide area network. In the second physical local area network, each second TOR may be connected to the second spine, the second spine is connected to the second GW, and the second GW is connected to the wide area network, so that the second physical local area network is connected to the wide area network. A first host located in the first physical local area network may access a first TOR in the first physical local area network, or a first host may access a router and is connected to a first TOR in the first physical local area network by using the router. A second host located in the second physical local area network may access a second TOR in the second physical local area network, or a second host may access a router and is connected to a second TOR in the second physical local area network by using the router.

In the first network architecture, a first device may be the first PE, the first GW, the first spine, the first TOR, or the like, and a second device may be the second PE, the second GW, the second spine, the second TOR, or the like. In other words, an SRv6 tunnel may be a tunnel between the first PE and the second PE, a tunnel between the first GW and the second GW, a tunnel between the first spine and the second spine, a tunnel between the first TOR and the second TOR, a tunnel between the first PE and the second GW, a tunnel between the first spine and the second GW, a tunnel between the first TOR and the second GW, or the like.

When an ingress device for the SRv6 tunnel is not the first TOR, if the first device is the first spine, the first GW, or the first PE, a first network device may be the first TOR accessed by the first host. Alternatively, when an ingress device for the SRv6 tunnel is the first TOR, that is, when the first device is the first TOR, a first network device may be the router accessed by the first host.

When an egress device for the SRv6 tunnel is not the second TOR, if the second device is the second spine, the second GW, or the second PE, a second network device may be the second TOR accessed by the second host. Alternatively, when an egress device for the SRv6 tunnel is the second TOR, that is, when the second device is the second TOR, a second network device may be the router accessed by the second host.

When the first device is the first PE, the first GW, the first spine, or the like, a second NVO3 tunnel is a tunnel between the first TOR accessed by the first host and the first device. Optionally, when the first device is the first PE, the second NVO3 tunnel may include two NVO3 tunnel segments: a first NVO3 tunnel segment and a second NVO3 tunnel segment. The first NVO3 tunnel segment is an NVO3 tunnel between the first TOR accessed by the first host and the first GW, and the second NVO3 tunnel segment is an NVO3 tunnel between the first GW and the first PE.

When the first device is the first TOR, the second NVO3 tunnel is a tunnel between the router accessed by the first host and the first TOR.

When the second device is the second PE, the second GW, the second spine, or the like, a first NVO3 tunnel is a tunnel between the second TOR accessed by the second host and the second device. Optionally, when the second device is the second PE, the first NVO3 tunnel may include two NVO3 tunnel segments: a third NVO3 tunnel segment and a fourth NVO3 tunnel segment. The third NVO3 tunnel segment is an NVO3 tunnel between the second PE and the second GW, and the fourth NVO3 tunnel segment is an NVO3 tunnel between the second GW and the second TOR accessed by the second host.

When the second device is the second TOR, the first NVO3 tunnel is a tunnel between the router accessed by the second host and the second TOR.

Figure 3:
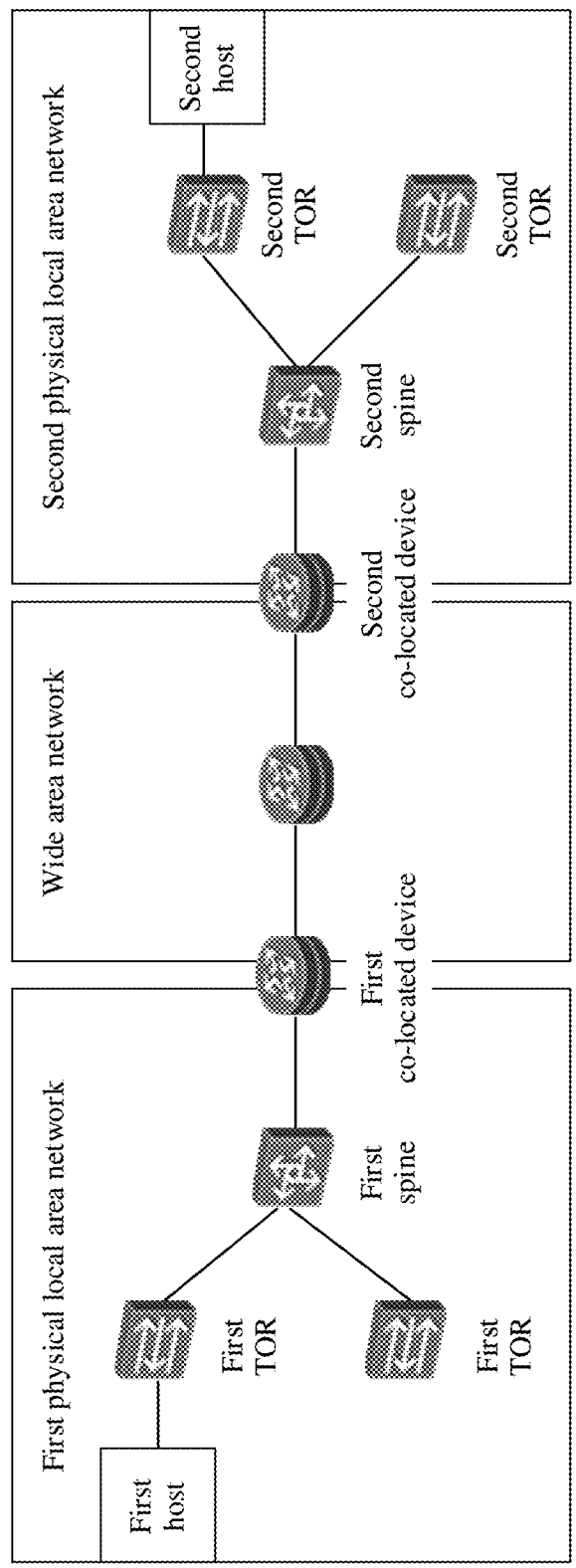
FIG. 3 is a schematic diagram of another example network architecture according to an embodiment of this application.

For a second network architecture, refer to FIG. 3. Compared with the first network architecture, the second network architecture includes a first co-located device that replaces a first PE located in a wide area network and a first GW located in a first physical local area network, and includes a second co-located device that replaces a second PE located in the wide area network and a second GW located in a second physical local area network. The first co-located device has a function of the first PE and a function of the first GW, and the first co-located device is located in both the wide area network and the first physical local area network. The second co-located device has a function of the second PE and a function of the second GW, and the second co-located device is located in both the wide area network and the second physical local area network. In the second network architecture, the first physical local area network includes a first spine, at least one first TOR device, and the like, and the second physical local area network includes a second spine, at least one second TOR, and the like. In the first physical local area network, each first TOR may be connected to the first spine, and the first spine is connected to the first co-located device, so that the first physical local area network is connected to the wide area network. In the second physical local area network, each second TOR may be connected to the second spine, and the second spine is connected to the second co-located device, so that the second physical local area network is connected to the wide area network. A first host located in the first physical local area network may access one first TOR, and a second host located in the second physical local area network may access one second TOR.

In the second network architecture, a first device may be the first co-located device, and a second device may be the second co-located device. In other words, an SRv6 tunnel may be a tunnel between the first co-located device and the second co-located device. A first network device is the first TOR accessed by the first host, and a second NVO3 tunnel is a tunnel between the first TOR accessed by the first host and the first co-located device. A second network device is the second TOR accessed by the second host, and a first NVO3 tunnel is a tunnel between the second co-located device and the second TOR accessed by the second host.

Figure 4:
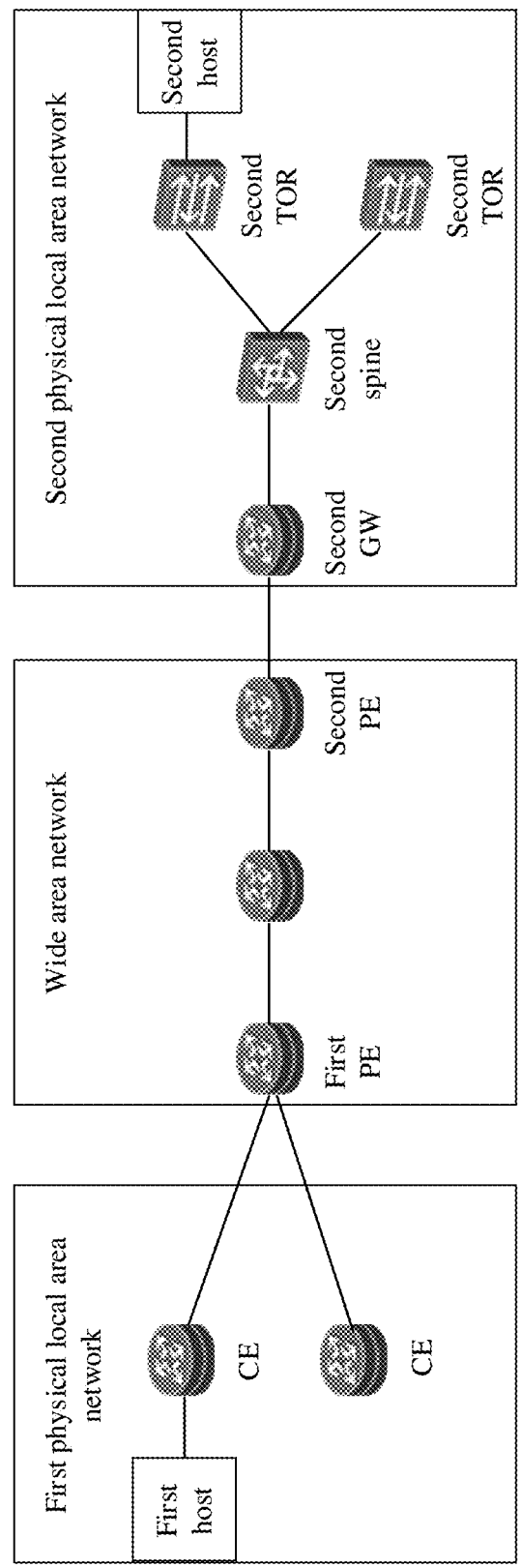
FIG. 4 is a schematic diagram of another example network architecture according to an embodiment of this application.

For a third network architecture, refer to FIG. 4. A topology of a first physical local area network is different from a topology of a second physical local area network. The first physical local area network includes a device such as a customer edge (CE). The second physical local area network includes a second spine, a second GW, at least one second TOR, and the like. Each CE in the first physical local area network is connected to a first PE in a wide area network, so that the first physical local area network is connected to the wide area network. In the second physical local area network, each second TOR may be connected to the second spine, the second spine is connected to the second GW, and the second GW is connected to a second PE in the wide area network, so that the second physical local area network is connected to the wide area network. A first host located in the first physical local area network may access one CE. A second host located in the second physical local area network may access one second TOR, or a second host accesses a router and is connected to a second TOR by using the router.

In the third network architecture, a first device may be the first PE, and a second device may be the second PE, the second GW, the second spine, the second TOR, or the like. In other words, an SRv6 tunnel may be a tunnel between the first PE and the second PE, a tunnel between the first PE and the second GW, a tunnel between the first PE and the second spine, a tunnel between the first PE and the second TOR, or the like.

A first network device may be the CE accessed by the first host. A second NVO3 tunnel is a tunnel between the CE accessed by the first host and the first device.

When the second device is the second PE, the second GW, the second spine, or the like, a second network device may be the second TOR accessed by the second host. A first NVO3 tunnel is a tunnel between the second TOR accessed by the second host and the second device. Optionally, when the second device is the second PE, the first NVO3 tunnel may include two NVO3 tunnel segments, that is, include a third NVO3 tunnel segment between the second PE and the second GW and a fourth NVO3 tunnel segment between the second GW and the second TOR.

When the second device is the second TOR, the second network device is the router accessed by the second host. The first NVO3 tunnel is a tunnel between the router accessed by the second host and the second TOR.

Figure 5:
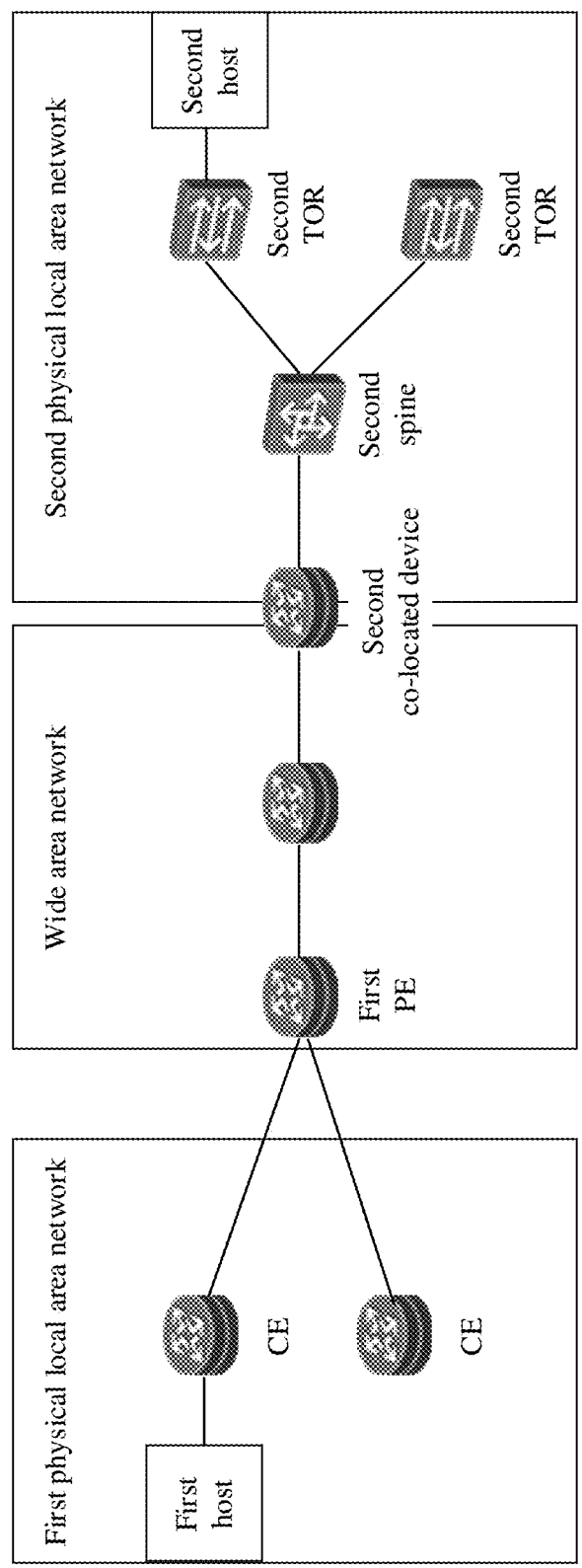
FIG. 5 is a schematic diagram of another example network architecture according to an embodiment of this application.

For a fourth network architecture, refer to FIG. 5. Compared with the third network architecture, the fourth network architecture uses a second co-located device to replace a second PE located in a wide area network and a second GW located in a second physical local area network. The second co-located device has a function of the second PE and a function of the second GW, and the second co-located device is located in both the wide area network and the second physical local area network. In the fourth network architecture, a first physical local area network includes a device such as a CE. The second physical local area network includes a second spine, at least one second TOR, and the like. Each CE in the first physical local area network is connected to a first PE in a wide area network, so that the first physical local area network is connected to the wide area network. In the second physical local area network, each second TOR may be connected to the second spine, and the second spine is connected to the second co-located device, so that the second physical local area network is connected to the wide area network. A first host located in the first physical local area network may access one CE, and a second host located in the second physical local area network may access one second TOR.

In the fourth network architecture, a first device may be a first PE, and a second device may be the second co-located device. In other words, an SRv6 tunnel may be a tunnel between the first PE and the second co-located device. A first network device is the CE accessed by the first host, and a second NVO3 tunnel is a tunnel between the CE accessed by the first host and the first device. A second network device is the second TOR accessed by the second host, and a first NVO3 tunnel is a tunnel between the second co-located device and the second TOR accessed by the second host.

Optionally, the first NVO3 tunnel may be a virtual extensible local area network (VXLAN) tunnel, a virtual local area network (VLAN) tunnel, a QinQ tunnel, or the like. The second NVO3 tunnel may be a VXLAN tunnel, a VLAN tunnel, a QinQ tunnel, or the like. The QinQ tunnel may also be referred to as a stacked virtual local area network (Stacked VLAN) tunnel. A tunnel type of the first NVO3 tunnel may be the same as or different from a tunnel type of the second NVO3 tunnel.

Optionally, a protocol type corresponding to the first NVO3 tunnel may be a VXLAN, network virtualization using generic routing encapsulation (NVGRE), generic network virtualization encapsulation (GENEVE), generic protocol extension for VXLAN (VXLAN-GPE), or the like. A protocol type corresponding to the second NVO3 tunnel may be a VXLAN, NVGRE, GENEVE, VXLAN-GPE, or the like. The protocol type corresponding to the first NVO3 tunnel may be the same as or different from the protocol type corresponding to the second NVO3 tunnel.

When the second NVO3 tunnel includes a first NVO3 tunnel segment and a second NVO3 tunnel segment, a protocol type corresponding to the first NVO3 tunnel segment may be the same as or different from a protocol type corresponding to the second NVO3 tunnel segment.

When the first NVO3 tunnel includes a third NVO3 tunnel segment and a fourth NVO3 tunnel segment, a protocol type corresponding to the third NVO3 tunnel segment may be the same as or different from a protocol type corresponding to the fourth NVO3 tunnel segment.

In any one of the foregoing network architectures, the first host is connected to the first device in advance, when the first host is connected to the first device, the first device establishes the second NVO3 tunnel between the first network device accessed by the first host and the first device, and the first device stores a network identifier of the virtual local area network to which the first host belongs. A process of establishing the second NVO3 tunnel is as follows:

The first host sends the first network device an identifier of the first host and the network identifier of the virtual local area network to which the first host belongs. The first network device stores a correspondence between the identifier of the first host and the network identifier of the virtual local area network, and sends routing information to the first device, where the routing information includes a device identifier of the first network device and the network identifier of the virtual local area network. The first device receives the routing information, and establishes the second NVO3 tunnel. After establishing the second NVO3 tunnel, the first device stores the network identifier of the virtual local area network.

Optionally, in the first network architecture shown in FIG. 2, when the first device is the first PE, the established second NVO3 tunnel includes two segments, and an establishment process may be: The first network device sends first routing information to the first GW, where the first routing information includes a device identifier of the first network device and the network identifier of the virtual local area network. The first GW establishes the first NVO3 tunnel segment between the first network device and the first GW based on the device identifier of the first network device and the network identifier of the virtual local area network. The first GW sends second routing information to the first device, where the second routing information includes a device identifier of the first GW and the network identifier of the virtual local area network. The first device establishes the second NVO3 tunnel segment between the first GW and the first device based on the device identifier of the first GW and the network identifier of the virtual local area network. In this way, the second NVO3 tunnel including the two NVO3 tunnel segments is obtained.

In the first network architecture shown in FIG. 2, when the first device is the first GW, the first spine, the first TOR, or the like, the established second NVO3 tunnel is one tunnel segment. Alternatively, in the second network architecture shown in FIG. 3, the third network architecture shown in FIG. 4, or the fourth network architecture shown in FIG. 5, the established second NVO3 tunnel is one tunnel segment.

Optionally, the device identifier in the embodiments of this application may be an address of the device, and the address may be an internet protocol (IP) address, a media access control (MAC layer) address, or the like. For example, the device identifier of the first network device may be an address of the first network device, that is, may be an IP address or a MAC address of the first network device. A concept of a device identifier in other content in the embodiments of this application is not described one by one.

After the first host is connected to the first device, when the second host starts, goes online, and accesses the second network device, or when the second host migrates from another network device to the second network device in the second physical local area network, a communication path between the first device and the second network device needs to be connected, where the communication path includes the SRv6 tunnel between the first device and the second device and the first NVO3 tunnel between the second device and the second network device. Therefore, the first host can send the packet to the second host through the second NVO3 tunnel and the communication path when the first host needs to send the packet to the second host.

Figure 6:
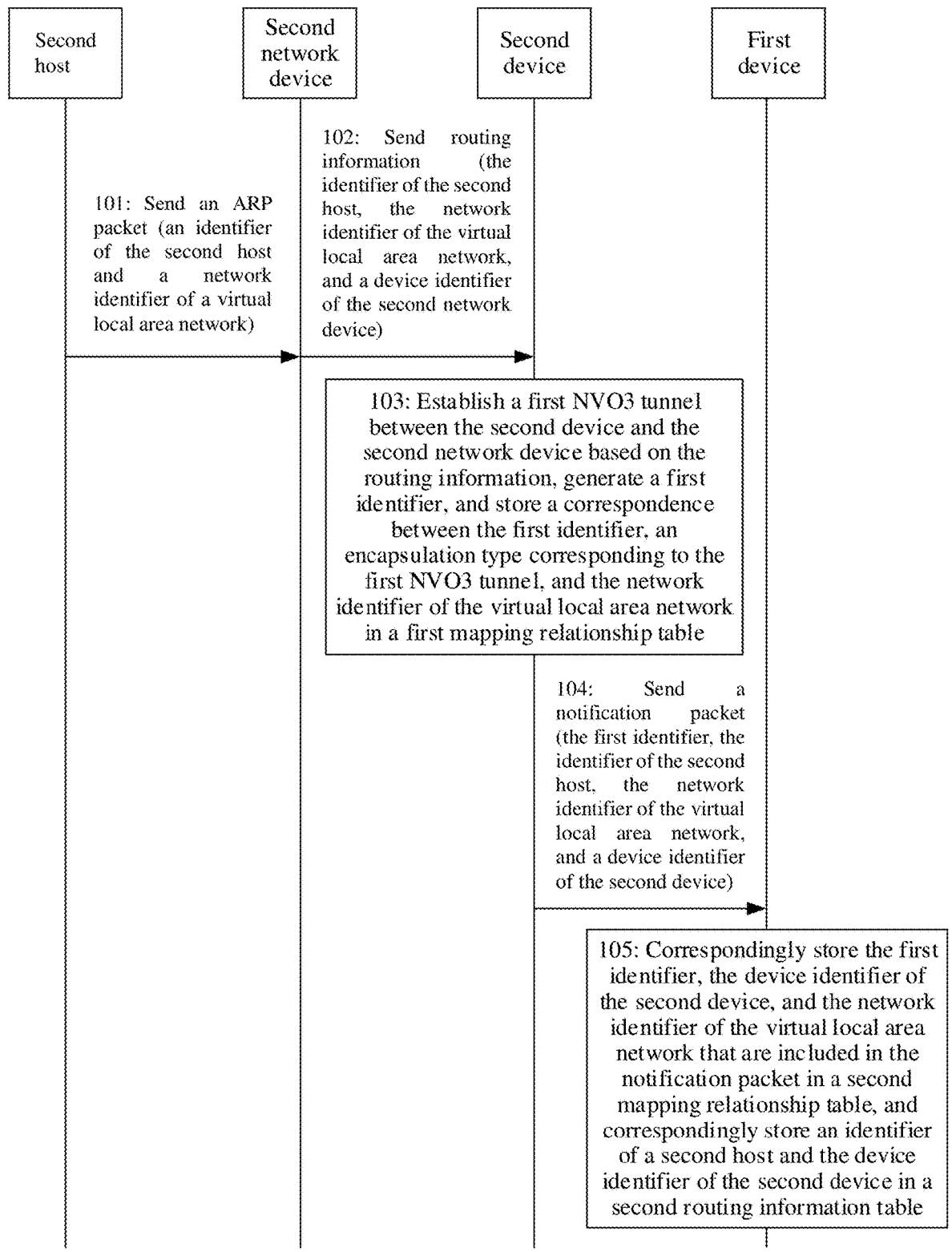
FIG. 6 is a flowchart of a method of connecting an example communication path according to an embodiment of this application.

Optionally, as shown in FIG. 6, for a communication path between a first device and a second network device, the communication path may be connected by using a process of the following steps 101 to 105. The method includes the following steps.

Step 101: A second host sends an address resolution protocol (ARP) packet to the second network device, where the ARP packet includes an identifier of the second host and a network identifier of a virtual local area network to which the second host belongs.

The second host sends the ARP packet to the second network device when the second host starts, goes online, and accesses the second network device, or when the second host migrates from a third network device to the second network device in the second physical local area network. The third network device is another network device in the second physical local area network except the second network device.

The second host migrates from the third network device to the second network device indicates that the second host disconnects a connection to the accessed third network device and establishes a connection to the fourth network device.

Step 102: The second network device sends routing information to a second device, where the routing information includes the identifier of the second host, the network identifier of the virtual local area network, and a device identifier of the second network device.

Optionally, the second network device may be a second TOR accessed by the second host, or may be a router accessed by the second host.

Optionally, when the second device is a second PE, the second network device sends third routing information to a second GW, where the third routing information includes the identifier of the second host, the network identifier of the virtual local area network, and the device identifier of the second network device. The second GW establishes a fourth NVO3 tunnel segment between the second GW and the second network device based on the network identifier of the virtual local area network and the device identifier of the second network device. The second GW sends fourth routing information to the second device, where the fourth routing information includes a device identifier of the second GW and the network identifier of the virtual local area network.

Step 103: The second device receives the routing information, establishes a first NVO3 tunnel between the second device and the second network device based on the routing information, generates a first identifier, and stores a correspondence between the first identifier, an encapsulation type corresponding to the first NVO3 tunnel, and the network identifier of the virtual local area network in a first mapping relationship table.

Optionally, the first identifier is used to identify the second device, and the first identifier includes an indication identifier, where the indication identifier is used to indicate the second device to convert a format of a packet forwarded through an SRv6 tunnel into a format of a packet forwarded through the first NVO3 tunnel. Alternatively, the first identifier is used to identify the second device and the second network device, and the first identifier includes an indication identifier, where the indication identifier is used to indicate the second device to convert a format of a packet forwarded through an SRv6 tunnel into a format of a packet forwarded through the first NVO3 tunnel.

The first device is an ingress device for the SRv6 tunnel. The first device stores the network identifier of the virtual local area network, so that the first device is configured to transmit a packet of a host belonging to the virtual local area network.

In this step, when the first identifier is used to identify the second device, after receiving the routing information, the second device establishes, based on the device identifier of the second network device and the network identifier of the virtual local area network, the first NVO3 tunnel that corresponds to the virtual local area network and that is between the second network device and the second device, to obtain the encapsulation type corresponding to the first NVO3 tunnel. The second device queries the first mapping relationship table in the first device based on the network identifier of the virtual local area network and the encapsulation type corresponding to the first NVO3 tunnel, where the first mapping relationship table is used to store the correspondence between the first identifier, the encapsulation type corresponding to the NVO3 tunnel, and the network identifier of the virtual local area network. If no corresponding first identifier is found, the second device generates the first identifier, and stores the correspondence between the first identifier, the encapsulation type corresponding to the first NVO3 tunnel, and the network identifier of the virtual local area network in the first mapping relationship table. If the corresponding first identifier is found, the operation ends.

If the corresponding first identifier is found in the first mapping relationship table, it indicates that another host that is in a second physical local area network and that is in the same virtual local area network as the first host has sent the routing information to the second device before this step is performed, has generated the first identifier before this step is performed, and has sent the first identifier to the first device. Therefore, the operation may end.

In this step, when the first identifier is used to identify the second device and the second network device, after receiving the routing information, the second device establishes, based on the device identifier of the second network device and the network identifier of the virtual local area network, the first NVO3 tunnel that corresponds to the virtual local area network and that is between the second network device and the second device. The second device obtains the encapsulation type corresponding to the first NVO3 tunnel, and queries the first mapping relationship table based on the network identifier of the virtual local area network, the encapsulation type corresponding to the first NVO3 tunnel, and the device identifier of the second network device, where the first mapping relationship table is used to store the correspondence between the first identifier, the encapsulation type corresponding to the NVO3 tunnel, the network identifier of the virtual local area network, and the device identifier of the network device. If no corresponding first identifier is found, the second device generates the first identifier, and correspondingly stores the first identifier, the encapsulation type corresponding to the first NVO3 tunnel, the network identifier of the virtual local area network, and the device identifier of the second network device in a first routing information table. If the corresponding first identifier is found, the operation ends.

If the corresponding first identifier is found in the first mapping relationship table, it indicates that the another host that is in the second physical local area network and that is in the same virtual local area network as the first host has accessed the second network device, has sent the routing information to the second device before this step is performed, has generated the first identifier before this step is performed, and has sent the first identifier to the first device. Therefore, the operation may end.

Optionally, when the second device is the second PE, the first NVO3 tunnel between the second device and the second network device includes two NVO3 tunnel segments: a third NVO3 tunnel segment between the second device and the second GW and a fourth NVO3 tunnel segment between the second GW and the second network device. The encapsulation type corresponding to the first NVO3 tunnel is an encapsulation type corresponding to the third NVO3 tunnel segment.

Optionally, when the second device is the second PE, the second device receives the fourth routing information, where the fourth routing information includes the device identifier of the second GW and the network identifier of the virtual local area network. The second device establishes the third NVO3 tunnel segment between the second device and the second GW based on the device identifier of the second GW and the network identifier of the virtual local area network, to obtain the two tunnel segments included in the first NVO3 tunnel: the third NVO3 tunnel segment between the second device and the second GW and the fourth NVO3 tunnel segment between the second GW and the second network device.

Optionally, when the second device is the second GW, a second spine, the second TOR, a second co-located device, or the like, the first NVO3 tunnel is a tunnel segment.

In this step, the second device further performs the following operations: The second device queries the first routing information table in the second device based on the identifier of the second host, where the first routing information table is used to store a correspondence between an identifier of a host and a device identifier of a network device; and if a device identifier of the corresponding third network device is found, updates the found device identifier of the third network device to the device identifier of the second network device; or if the device identifier of the corresponding third network device is not found, correspondingly stores the identifier of the second host and the device identifier of the second network device in the first routing information table.

When the first routing information table stores a record including the identifier of the second host and the device identifier of the third network device, it indicates that the second host migrates from the third network device to the second network device. When the second host accesses the third network device, the second host sends the third network device an ARP packet including an identifier of the second host and a network identifier of a virtual local area network. After receiving the ARP packet, the third network device sends routing information to the second device. The second device stores a correspondence between the identifier of the second host and the device identifier of the third network device in the first routing information table. Therefore, in this step, the first routing information table has stored the record including the identifier of the second host.

When the first routing information table does not store a record including the identifier of the second host, it indicates that the second host starts, and goes online. Therefore, the device identifier of the corresponding third network device cannot be found in the first routing information table.

A length of the first identifier is greater than a length of the network identifier of the virtual local area network. Generally, the network identifier of the virtual local area network is a VNI or a virtual subnet identifier (VSID). A length of the VNI and a length of the VSID each are 24 bits. Therefore, the length of the first identifier is greater than 24 bits. In this way, the first identifier may be used to identify all existing virtual local area networks, so that hosts distributed in different physical local areas but in a same virtual local area network can perform communication based on the first identifier.

Optionally, when the first identifier is used to identify the second device, the first identifier may include the device identifier of the second device and the indication identifier. When the first identifier is used to identify the second device and the second network device, the first identifier may include the device identifier of the second device, the indication identifier, and the device identifier of the second network device.

The first identifier may be a segment identifier (SID). A length of the SID may be 180 bits, and is far longer than the length of the network identifier of the virtual local area network. Therefore, the first identifier may be used to identify all the existing virtual local area networks.

Optionally, the encapsulation type corresponding to the first NVO3 tunnel may be a VXLAN encapsulation type, an NVGRE encapsulation type, a VXLAN-GPE encapsulation type, a GENEVE encapsulation type, or the like.

Step 104: The second device sends a notification packet to a first device, where the notification packet includes the first identifier, the network identifier of the virtual local area network, the device identifier of the second device, and the identifier of the second host.

As shown in any network architecture described in FIG. 1 to FIG. 3, when the second device is the second GW, the second spine, or the second TOR, the second device sends the notification packet to the second PE, and the second PE sends the notification packet to the first device.

As shown in any network architecture described in FIG. 1 to FIG. 5, when the second device is the second PE or the second co-located device, the second PE or the second co-located device sends the notification packet to the first device.

Optionally, in any network architecture shown in FIG. 1 to FIG. 5, a process in which the second PE or the second co-located device sends the notification packet to the first device may be as follows:

The second PE or the second co-located device sends the notification packet to all PEs in the wide area network. When the first device is the first PE or the first co-located device, the first device receives the notification packet; and the first device determines whether the first device stores the network identifier of the virtual local area network included in the notification packet, and performs the following step 105 if determining that the network identifier of the virtual local area network included in the notification packet is stored, or discards the notification packet if determining that the network identifier of the virtual local area network included in the notification packet is not stored. For another PE in the wide area network, when determining that the network identifier of the virtual local area network included in the notification packet is not stored, the another PE discards the notification packet and ends the operation.

In the first network architecture shown in FIG. 2, when the first device is the first GW, the first spine, the first TOR, or the like, the process in which the second PE sends the notification packet to the first device may be as follows:

The second PE sends the notification packet to the PE in the wide area network. After receiving the notification packet, the PE sends the notification packet to a physical local area network connected to the PE. The first device located in the physical local area network receives the notification packet; and determines whether the first device stores the network identifier of the virtual local area network included in the notification packet, and performs the following step 105 if determining that the network identifier of the virtual local area network included in the notification packet is stored, or discards the notification packet and ends the operation if determining that the network identifier of the virtual local area network included in the notification packet is not stored.

Step 105: The first device receives the notification packet, and correspondingly stores the first identifier, the device identifier of the second device, and the network identifier of the virtual local area network that are included in the notification packet in a second mapping relationship table, and correspondingly stores the identifier of the second host and the device identifier of the second device in a second routing information table.

When the first identifier is used to identify the second device, the first device correspondingly stores the first identifier, the device identifier of the second device, and the network identifier of the virtual local area network that are included in the notification packet in the second mapping relationship table. When the first identifier is used to identify the second device and the second network device, the first device correspondingly stores the first identifier, the network identifier of the virtual local area network, the device identifier of the first device, and the identifier of the second host that are included in the notification packet in the second mapping relationship table.

After the first device receives the notification packet, if no SRv6 tunnel is established between the first device and the second device, the first device establishes the SRv6 tunnel between the first device and the second device based on the device identifier of the second device. A transmission direction of the SRv6 tunnel is a transmission direction from the first device to the second device. Therefore, the communication path between the first device and the second network device is connected after the step is performed. The SRv6 tunnel with the transmission direction from the first device to the second device exists between the first device and the second device. Therefore, the communication path between the first device and the second network device is also connected after the step is performed.

The procedure from Step 101 to Step 105 is described by using the second host as an example. When another host in the second physical local area network starts and goes online or when another host migrates from one network device to another network device, the another host also performs the foregoing steps as the second host does. In the first network architecture shown in FIG. 2 or the second network architecture shown in FIG. 3, when starting, and going online or when migrating from one network device to another network device, the host in the first physical local area network performs the foregoing steps as the second host does.

Figure 7:
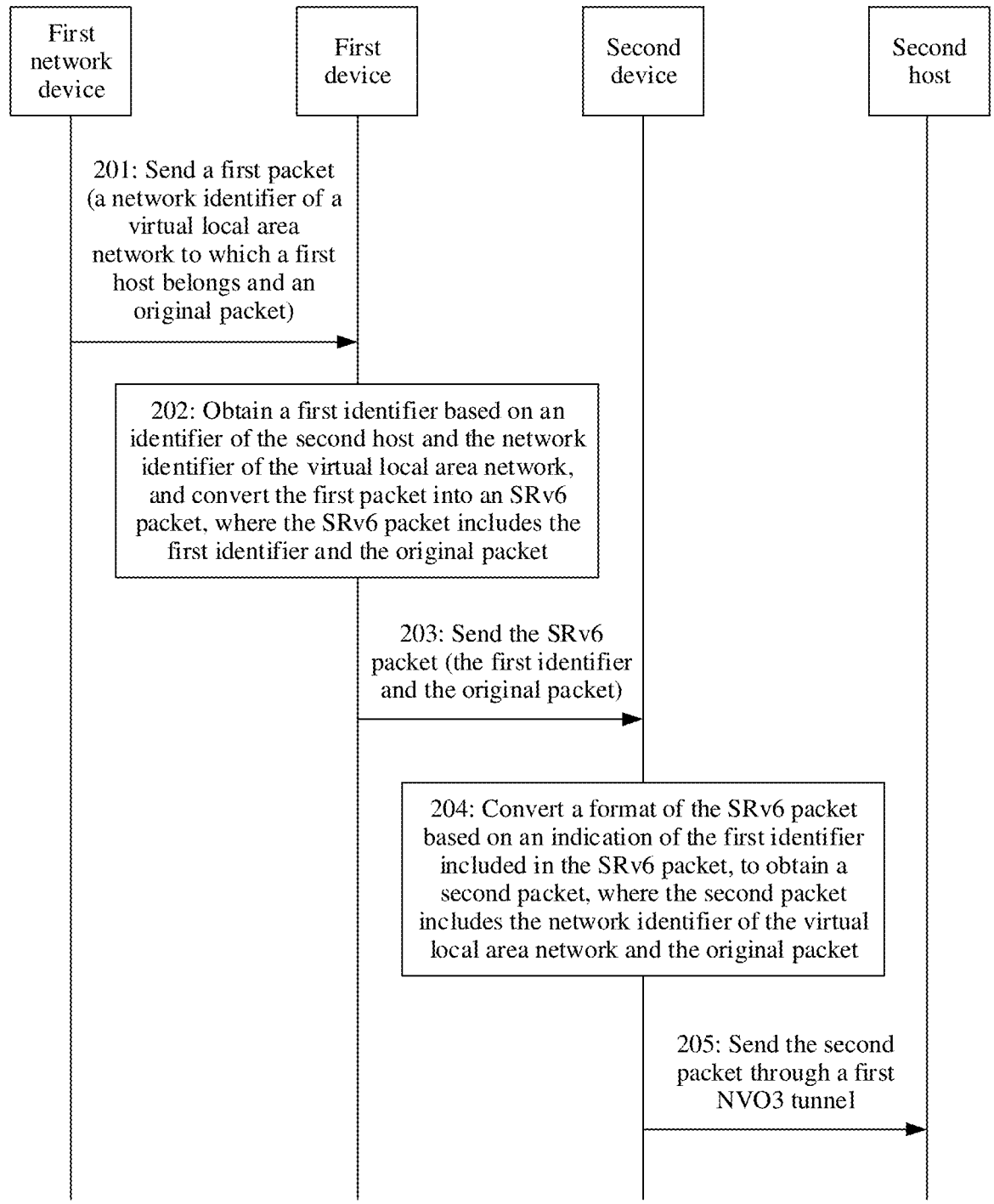
FIG. 7 is a flowchart of an example packet sending method according to an embodiment of this application.

As shown in FIG. 7, an embodiment of this application provides a packet sending method. The method is applied to any network architecture shown in FIG. 1 to FIG. 5. In the method, after a communication path between a first device and a second network device is connected, for example, after the communication path between the first device and the second network device is connected by using the method shown in FIG. 6, a first host may send a packet to a second host, where the packet may be a packet on a data plane. The method includes the following steps.

Step 201: A first network device receives an original packet sent by the first host, and sends a first packet to the first device, where the original packet includes an identifier of the second host, and the first packet includes a network identifier of a virtual local area network to which the first host belongs and the original packet.

Figure 8:
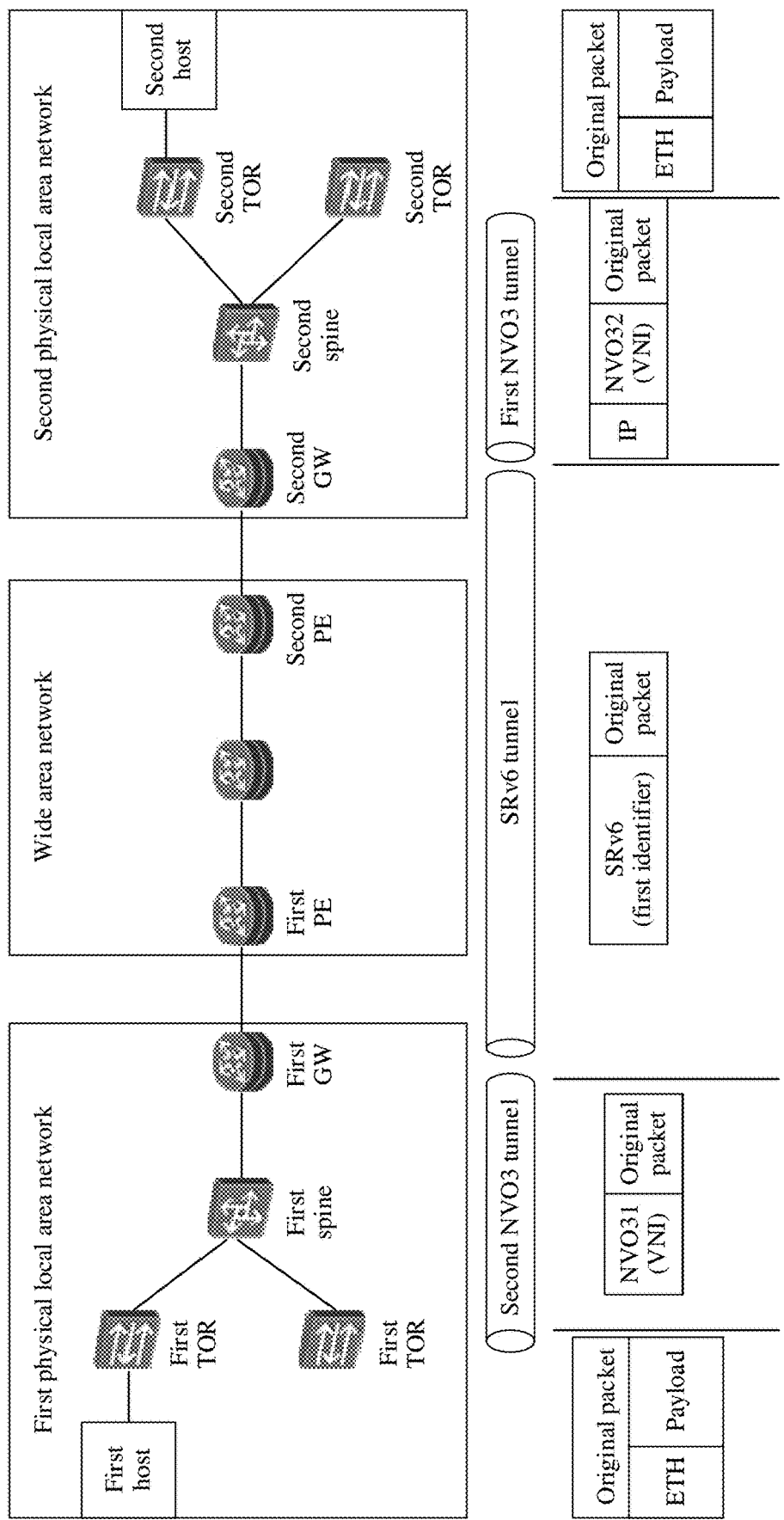
FIG. 8 is a schematic diagram of an example packet transmission process in a first network architecture according to an embodiment of this application.
Figure 9:
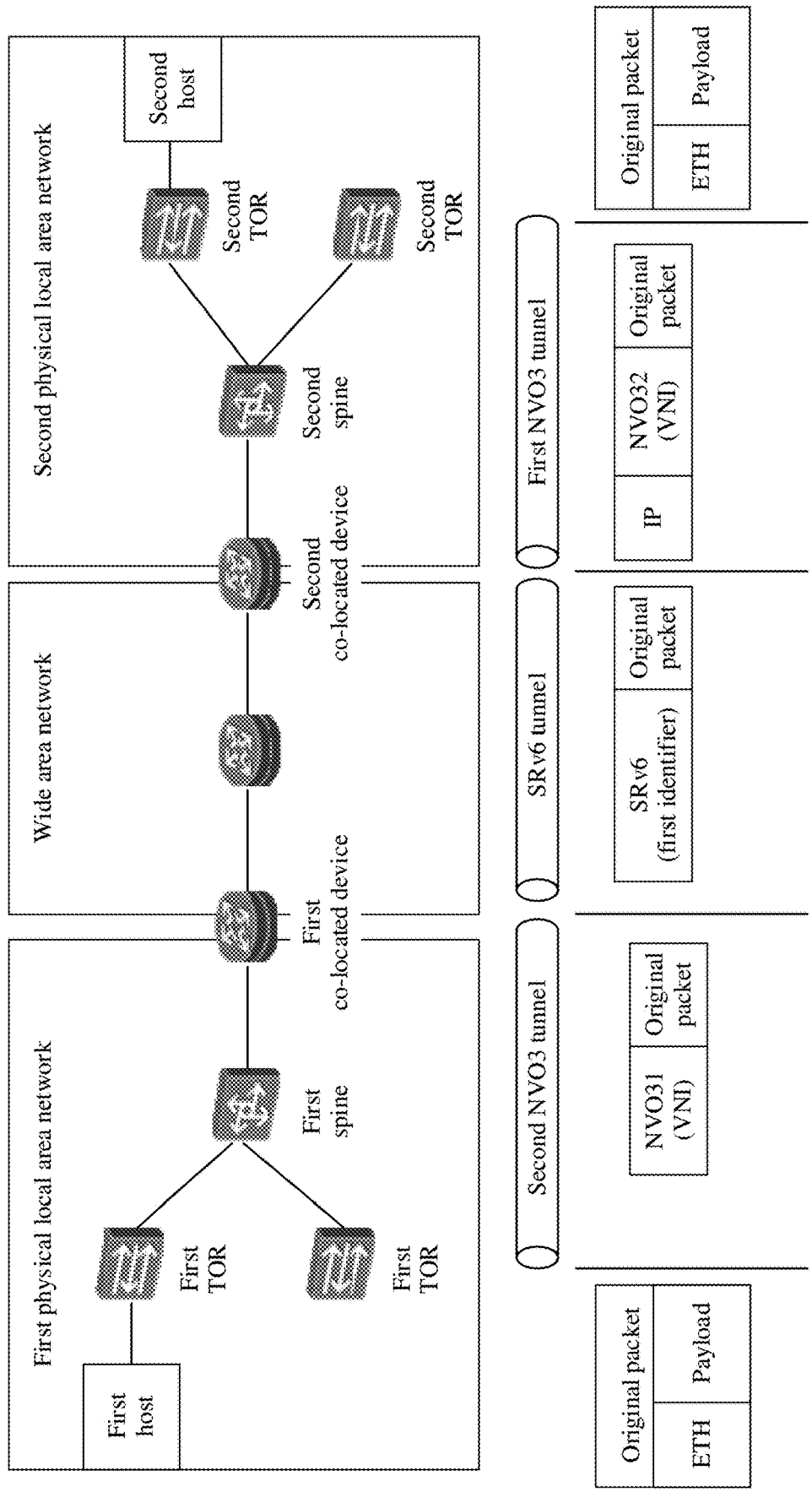
FIG. 9 is a schematic diagram of an example packet transmission process in a second network architecture according to an embodiment of this application.
Figure 10:
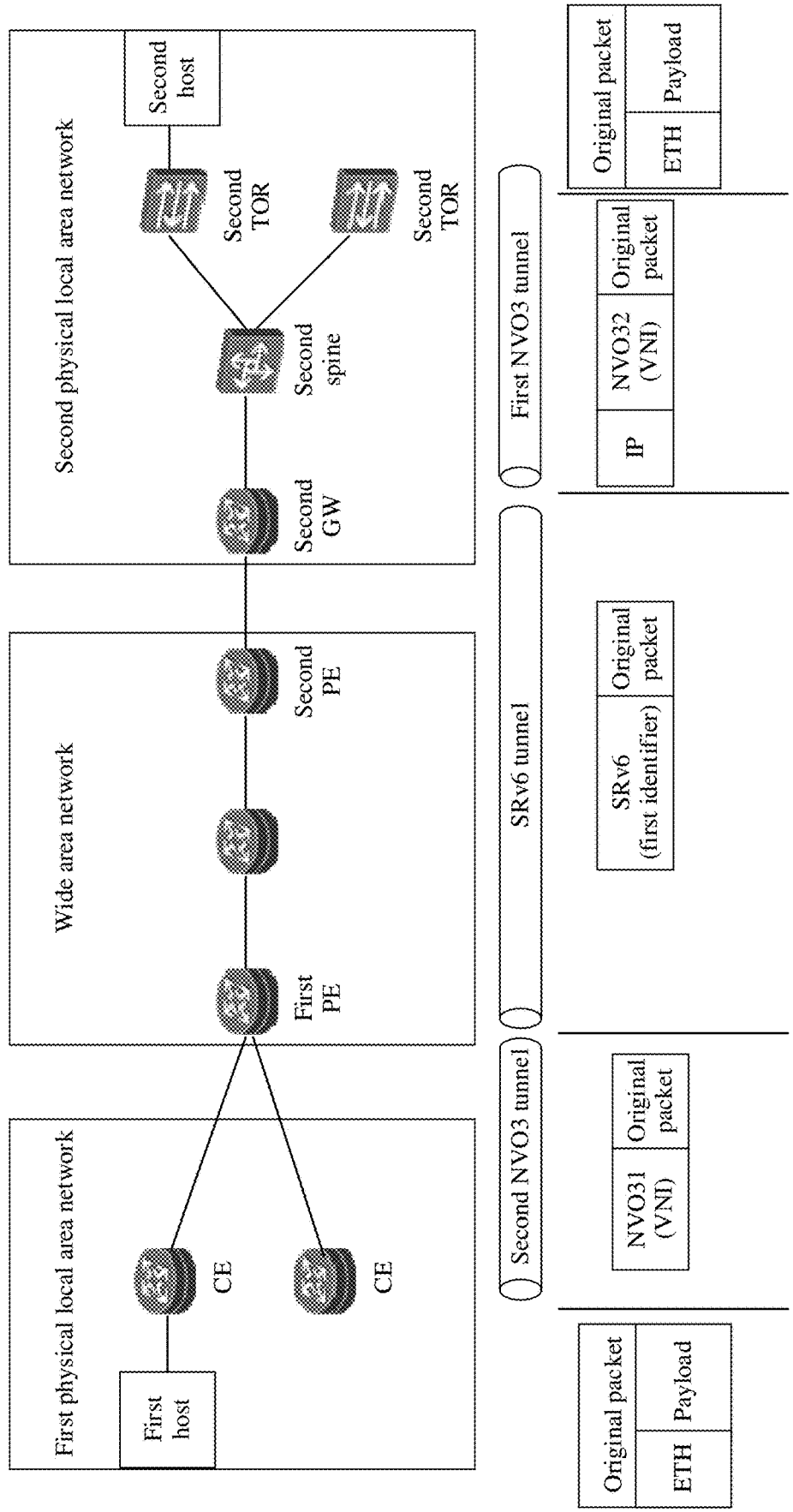
FIG. 10 is a schematic diagram of an example packet transmission process in a third network architecture according to an embodiment of this application.
Figure 11:
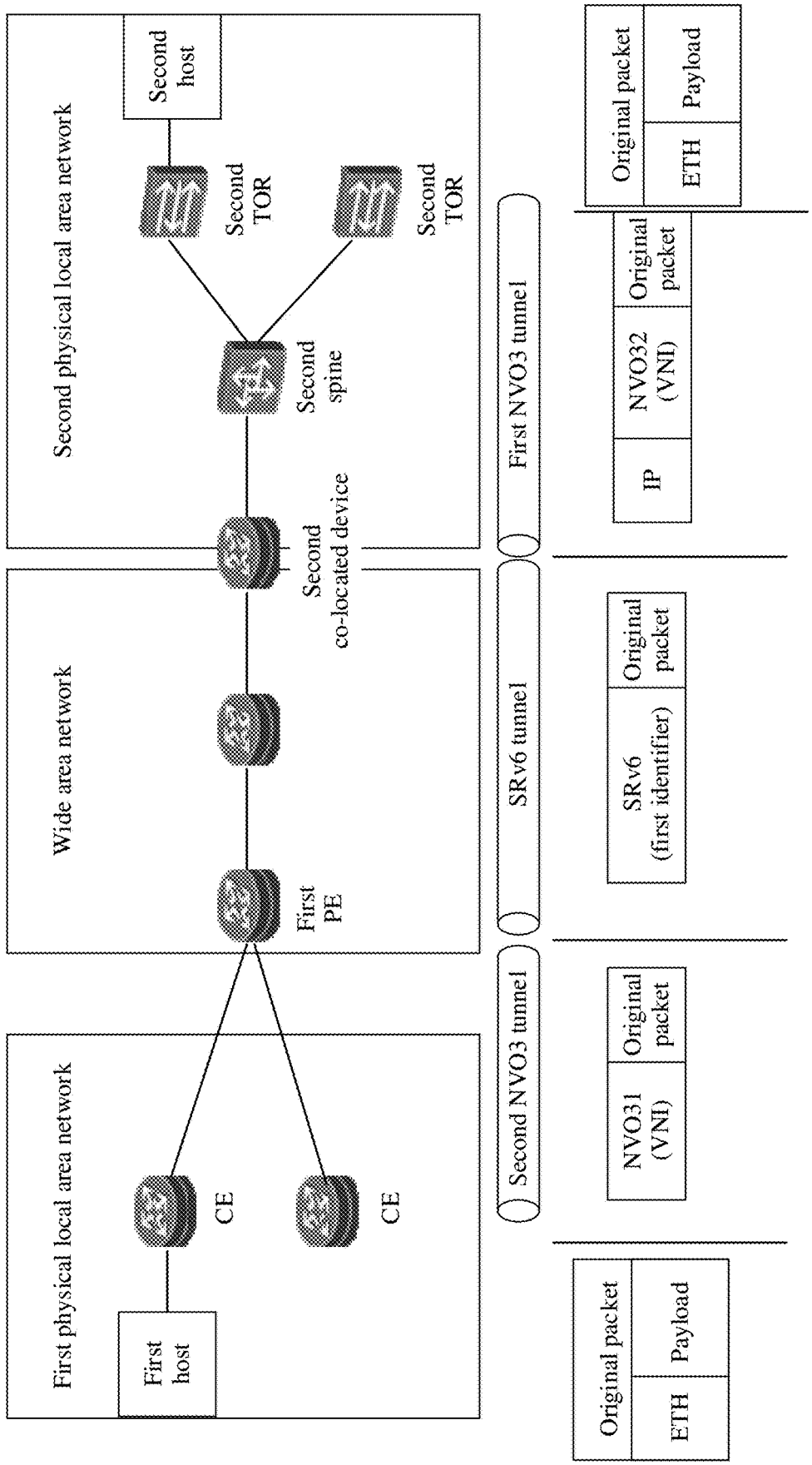
FIG. 11 is a schematic diagram of an example packet transmission process in a fourth network architecture according to an embodiment of this application.

Optionally, as shown in FIG. 8, when the first network architecture is applied and the first device is a first GW, a first spine, or a first TOR, or as shown in FIG. 9 to FIG. 11, when the second network architecture, the third network architecture, or the fourth network architecture are applied, the first network device receives the original packet sent by the first host, and obtains, based on the identifier of the first host included in the original packet, the network identifier of the virtual local area network to which the first host belongs from a correspondence between the identifier of the first host and the network identifier of the virtual local area network, where the original packet includes an Ethernet (ETH) header and a payload. The first network device determines, based on the network identifier of the virtual local area network, a second NVO3 tunnel that is between the first network device and the first device and that corresponds to the virtual local area network. The first network device adds a header (NVO31 shown in FIG. 8 to FIG. 11) corresponding to the second NVO3 tunnel to the original packet to obtain a first packet, where the header includes the network identifier (a VNI shown in FIG. 8 to FIG. 11) of the virtual local area network. The first network device sends the first packet to the first device through the second NVO3 tunnel.

Figure 12:
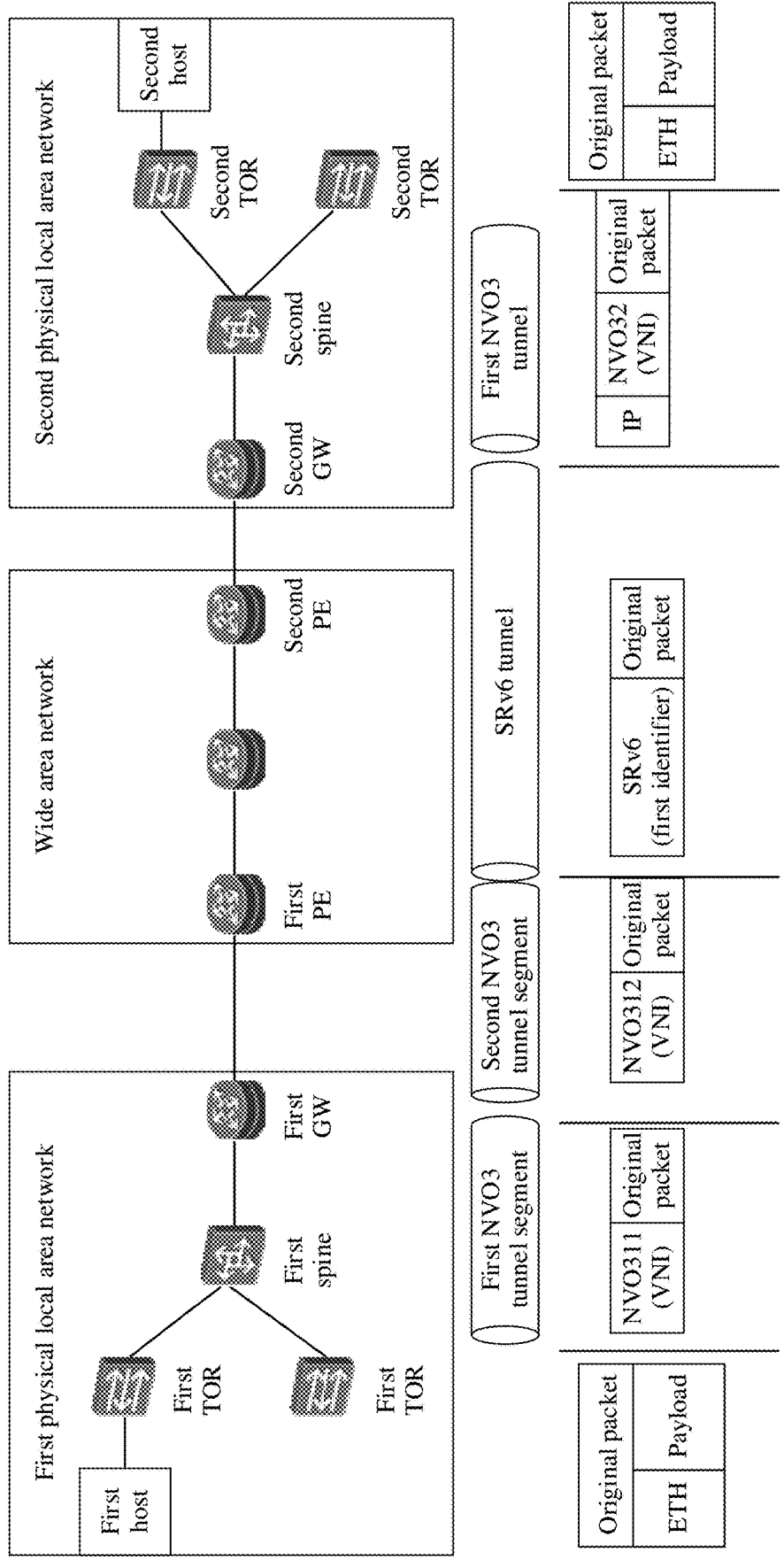
FIG. 12 is a schematic diagram of another example packet transmission process in the first network architecture according to an embodiment of this application.

Optionally, as shown in FIG. 12, when the first network architecture is applied and the first device is a first PE, the second NVO3 tunnel includes a first NVO3 tunnel segment between the first network device and a first GW and a second NVO3 tunnel segment between the first GW and the first device. The first network device determines, based on the network identifier of the virtual local area network, the first NVO3 tunnel segment that is between the first network device and the first GW and that corresponds to the virtual local area network. The first network device adds a header (NVO311 shown in FIG. 12) corresponding to the first NVO3 tunnel segment to an original packet, to obtain a third packet, and sends the third packet to the first GW through the first NVO3 tunnel segment, where the header includes the network identifier (a VNI shown in FIG. 12) of the virtual local area network. The first GW receives the third packet, reads the network identifier of the virtual local area network from the third packet, and removes the header corresponding to the first NVO3 tunnel segment from the third packet to obtain the original packet. The first GW determines, based on the network identifier of the virtual local area network, the second NVO3 tunnel segment that is between the first GW and the first device and that corresponds to the virtual local area network, adds a header (NVO312 shown in FIG. 12) corresponding to the second NVO3 tunnel segment to the original packet to obtain the first packet, and sends the first packet to the first device through the second NVO3 tunnel segment, where the header includes the network identifier of the virtual local area network.

Optionally, when a protocol type corresponding to the second NVO3 tunnel is VXLAN-GPE or GENEVE, the first network device further obtains second metadata, where the second metadata may be at least one of additional information of the original packet or device information of the first network device. Correspondingly, the header corresponding to the second NVO3 tunnel in the first packet further includes the second metadata.

Optionally, the second metadata includes at least one of an identifier of an application, an identifier (ID) of a user group, in-situ operations, administration, and maintenance (iOAM), or the like. In addition to one or more types of data enumerated above, the second metadata may further include another type of data. This is not enumerated herein one by one.

Optionally, when the second metadata may be the additional information of the original packet, the first network device receives the second metadata sent by the first host.

Optionally, when the protocol type corresponding to the second NVO3 tunnel is VXLAN-GPE, the header corresponding to the second NVO3 tunnel includes a generic protocol extension for VXLAN header (VXLAN-GPE Shim Header) field. The VXLAN-GPE Shim Header field includes the second metadata.

Figure 13:
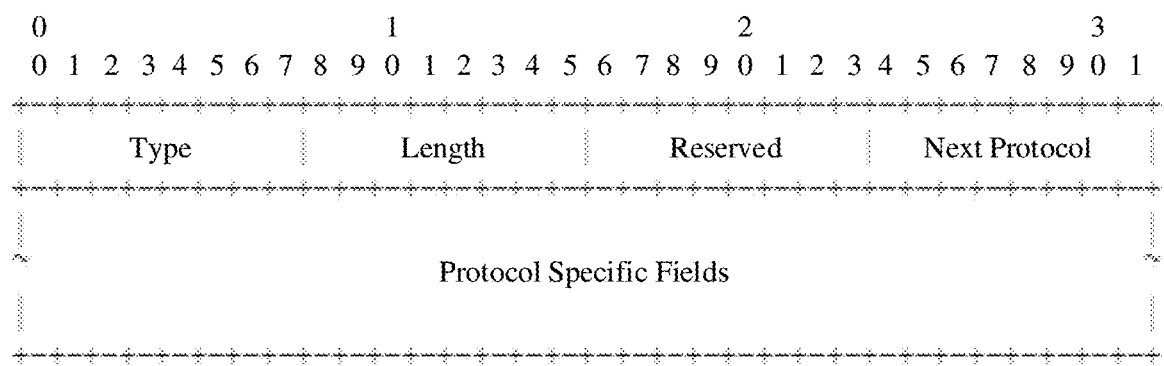
FIG. 13 is a schematic diagram of an example structure of a header corresponding to an NVO3 tunnel according to an embodiment of this application.

Optionally, as shown in FIG. 13, the VXLAN-GPE Shim Header field includes a type field, a length field, and a content field (Protocol Specific Field). The type field includes two subfields: One is a type subfield, and the other is a next protocol header (Next Protocol) subfield. The content field includes the second metadata, and the length field includes a length of the second metadata in the content field. The type field includes a data type of the content field, and content included in the two subfields in the type field is combined to obtain the data type.

Optionally, when the protocol type corresponding to the second NVO3 tunnel is GENEVE, the header corresponding to the second NVO3 tunnel includes a generic network virtualization encapsulation header (GENEVE Header) field, and the GENEVE header field includes the second metadata.

Figure 14:
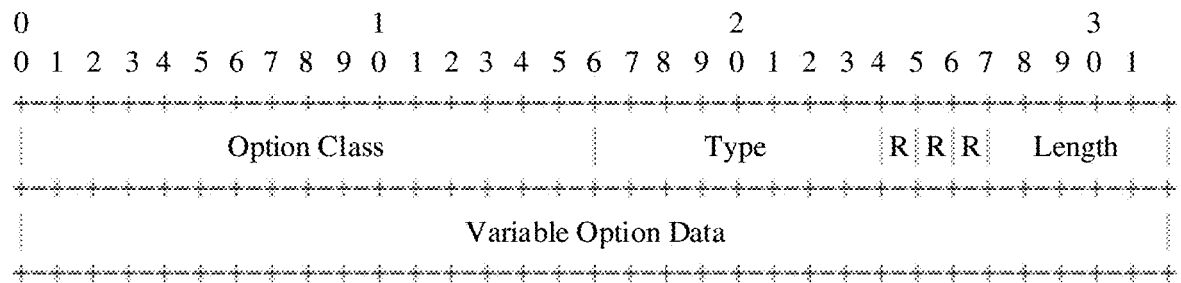
FIG. 14 is a schematic diagram of an example structure of another header corresponding to an NVO3 tunnel according to an embodiment of this application.

As shown in FIG. 14, the GENEVE header field includes a type field, a length field, and a content field (Variable Option Data). The type field includes two subfields: One is an option class subfield, and the other is a type subfield. The content field includes the second metadata, the length field includes a length of the second metadata in the content field, and the type field includes a data type of the content field. The type field includes a data type of the content field, and content included in the two subfields in the type field is combined to obtain the data type.

Step 202: The first device receives the first packet, obtains a first identifier based on the identifier of the second host and the network identifier of the virtual local area network, and converts the first packet into an SRv6 packet, where the SRv6 packet includes the first identifier and the original packet.

This step may be completed by using the following operations in 2021 to 2023, and the operations in 2021 to 2023 may be as follows:

2021: The first device obtains a device identifier of a second device based on the identifier of the second host and the network identifier of the virtual local area network.

The first device receives the first packet, obtains the network identifier of the virtual local area network from the header corresponding to the second NVO3 tunnel in the first packet, and removes the header corresponding to the second NVO3 tunnel from the first packet, to obtain the original packet. The first device reads the identifier of the second host from the original packet, and obtains the device identifier of the second device from a second routing information table based on the identifier of the second host.

After obtaining the device identifier of the second device, the first device determines the SRv6 tunnel between the first device and the second device based on the device identifier of the second device.

2022: The first device obtains the first identifier from a second mapping relationship table based on the network identifier of the virtual local area network and the device identifier of the second device.

Optionally, the second mapping relationship table is used to store a correspondence between a network identifier, a device identifier, the identifier of the second host, and the first identifier.

The first device obtains the first identifier from the second mapping relationship table based on the network identifier of the virtual local area network, the device identifier of the second device, and the identifier of the second host.

2023: The first device adds an SRv6 header to the original packet, to obtain the SRv6 packet, where the SRv6 header includes the first identifier.

Figure 15:
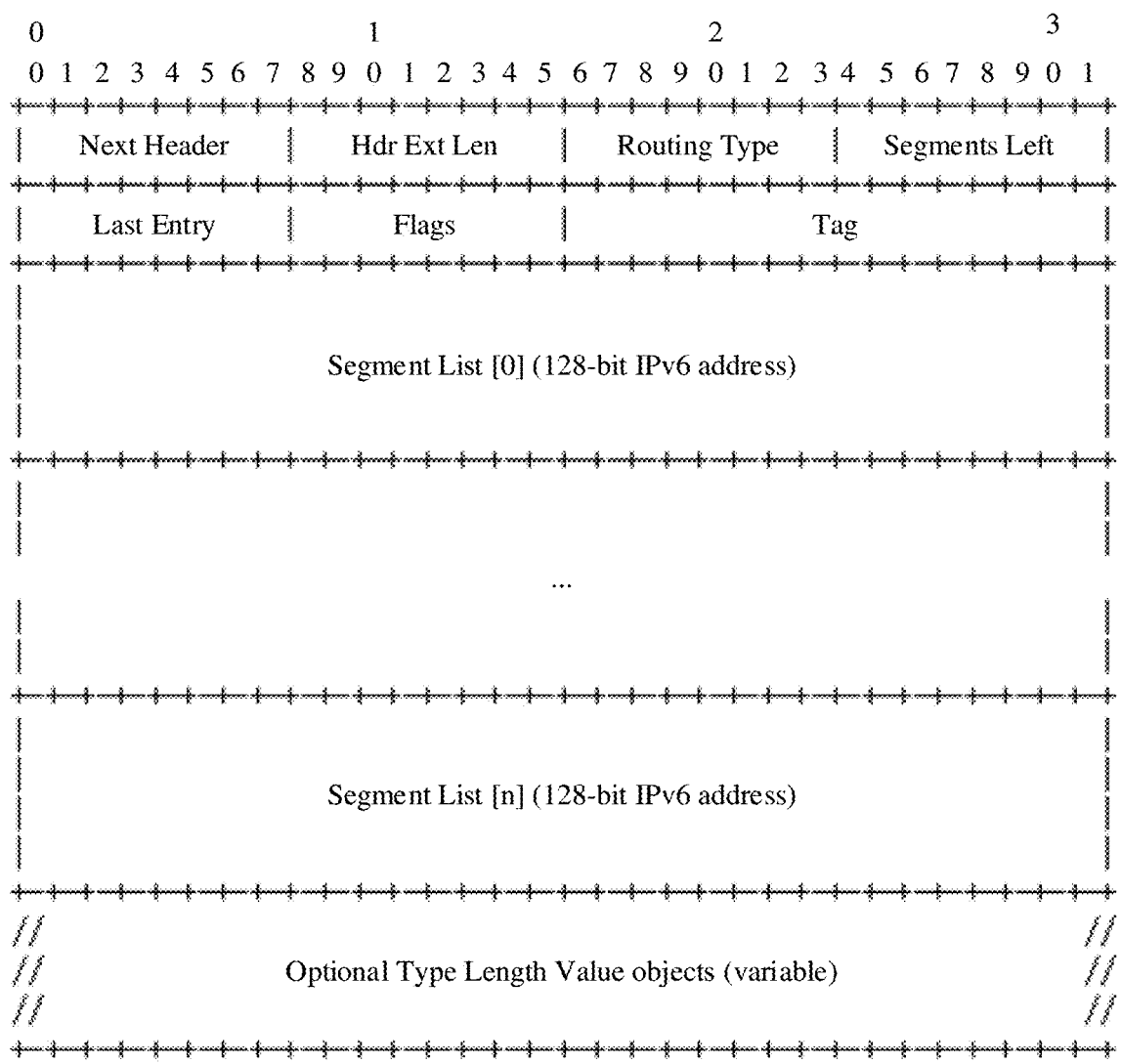
FIG. 15 is a schematic diagram of an example structure of an SRv6 header according to an embodiment of this application.

Refer to an SRv6 header shown in FIG. 15. The SRv6 header may also be referred to as a segment routing header. The SRv6 header includes the following fields: a next header field, a header extended length (Hdr Ext Len) field, a routing type field, an SRv6 segments left field, a last entry field, a flags field, a tag field for the SRv6 packet, a segment list field, an optional type length value (OTLV) field, and the like. The segment list field includes (n+1) SIDs, which are respectively an SID 0 to an SID n, where n is an integer greater than 0. Optionally, each SID may include a 128-bit internet protocol version 6 (IPv6) address (128-bit IPv6 address).

Optionally, the segment list field in the SRv6 header includes the first identifier. The first identifier may be one SID, and the first identifier may be the last SID in the segment list field, namely, the SID 0.

As shown in FIG. 15, the segment list field includes (n+1) subfields, which are a segment list [0], a segment list [1], . . . , and a segment list [n]. The SID 0 to the SID n are located in the segment list [0] to the segment list [n] respectively.

Optionally, the first device may further obtain first metadata. Correspondingly, the SRv6 header may further include the first metadata.

Optionally, an IPv6 hop-by-hop options header in the SRv6 header includes the first metadata, a destination options header in the SRv6 header includes the first metadata, or a segment routing header in the SRv6 header includes the first metadata.

Optionally, the IPv6 hop-by-hop options header includes a TLV field, the destination options header includes a TLV field, and the segment routing header includes a TLV field. The first metadata may be included in the TLV field in the IPv6 hop-by-hop options header, the TLV field in the destination options header, or the TLV field in the segment routing header.

Optionally, for any one of the foregoing TLV fields, the TLV field includes a type field (type), a length field (length), and a content field (value). The content field includes the first metadata, the type field includes a data type of the content field, and the length field includes a length of the first metadata in the content field.

Optionally, the first device may obtain device information of the first device as the first metadata; and/or when the first packet further includes the second metadata, the first device converts a format of the second metadata based on the protocol type corresponding to the second NVO3 tunnel and a field type of the second metadata included in the first packet, to obtain the first metadata.

Optionally, a process of converting the format of the second metadata may be as follows:

In the first packet, the header corresponding to the second NVO3 tunnel includes the type field, the length field, and the content field. The first device obtains the protocol type corresponding to the second NVO3 tunnel, and obtains the second metadata included in the content field, the data type of the content field included in the type field, and the length that is of the second metadata in the content field and that is included in the length field.

The first device obtains a data type of a content field corresponding to the SRv6 tunnel from a correspondence between a protocol type corresponding to an NVO3 tunnel, a data type of a content field corresponding to the NVO3 tunnel, and the data type of the content field corresponding to the SRv6 tunnel based on the data type of the content field corresponding to the second NVO3 tunnel and the protocol type corresponding to the second NVO3 tunnel, and specifies that the type field in the SRv6 header includes the data type of the content field corresponding to the SRv6 tunnel.

The first device obtains a length conversion rule and a format conversion rule corresponding to the content field corresponding to the second NVO3 tunnel from a correspondence between the protocol type corresponding to the NVO3 tunnel, a length conversion rule corresponding to the content field corresponding to the NVO3 tunnel, and a format conversion rule corresponding to the content field corresponding to the NVO3 tunnel based on the protocol type corresponding to the second NVO3 tunnel. The length conversion rule is used to describe a conversion relationship between the length of the second metadata in the header corresponding to the second NVO3 tunnel and the length of the first metadata in the SRv6 header. The format conversion rule is used to describe a conversion relationship between a format of the second metadata in the header corresponding to the second NVO3 tunnel and a format of the first metadata in the SRv6 header. The first device obtains the length of the first metadata according to the length conversion rule and the length of the second metadata, and specifies that the length field in the SRv6 header includes the length of the first metadata. The first device converts the format of the second metadata according to the format conversion rule to obtain the first metadata, and specifies that the content field in the SRv6 header includes the first metadata.

The length that is of the first metadata and that is included in the length field in the SRv6 header is in a unit of byte.

When the protocol type corresponding to the second NVO3 tunnel is VXLAN-GPE, the length that is of the second metadata and that is included in the length field in the header corresponding to the second NVO3 tunnel is also in a unit of byte, but the length does not include lengths of first four bytes in the content field. Therefore, the length conversion rule is L1=L2−4, where L2 is the length that is of the first metadata and that is included in the length field in the SRv6 header, and L1 is the length that is of the second metadata and that is included in the length field in the header corresponding to the second NVO3 tunnel.

When the protocol type corresponding to the second NVO3 tunnel is GENEVE, the length that is of the second metadata and that is included in the length field in the header corresponding to the second NVO3 tunnel is in a unit of four bytes, but the length does not include lengths of first four bytes in the content field. Therefore, the length conversion rule is L3=(L2−4)/4, where L2 is the length that is of the first metadata and that is included in the length field in the SRv6 header, and L3 is the length that is of the second metadata and that is included in the length field in the header corresponding to the second NVO3 tunnel.

Step 203: The first device sends the SRv6 packet to the second device through the SRv6 tunnel between the first device and the second device.

Optionally, in a process of transmitting the SRv6 packet to the second device through the SRv6 tunnel, after a network device through which the SRv6 packet passes receives the SRv6 packet, the network device may add metadata to the SRv6 header in the SRv6 packet, and then forward the SRv6 packet, where the added metadata may be device information of the network device.

It should be noted that, in the first network architecture shown in FIG. 8 or in the second network architecture shown in FIG. 9, the first device may be the first co-located device, the first GW, the first spine, or the first TOR. In other words, an ingress device for the SRv6 tunnel may be the first co-located device, the first GW, the first spine, or the first TOR. In this case, the second NVO3 tunnel includes one NVO3 tunnel segment. Therefore, a packet format of the first packet only needs to be converted once, and then a converted SRv6 packet can be sent through the SRv6 tunnel. This reduces a quantity of times for packet format conversion, and improves packet sending efficiency.

Step 204: The second device receives the SRv6 packet, and converts a format of the SRv6 packet based on an indication of the first identifier included in the SRv6 packet, to obtain a second packet, where the second packet includes the network identifier of the virtual local area network and the original packet.

This step may be completed by using the following operations in 2041 and 2042, and the operations in 2041 and 2042 may be as follows:

2041: The second device obtains the first identifier from the SRv6 packet, and obtains the network identifier of the corresponding virtual local area network and an encapsulation type corresponding to a first NVO3 tunnel from a first mapping relationship table based on the first identifier.

The second device obtains the first identifier from the SRv6 header in the SRv6 packet. When the first identifier is used to identify the second device, the second device reads the identifier of the second host from the original packet in the SRv6 packet, and obtains a device identifier of the second network device accessed by the second host from a first routing information table based on the identifier of the second host.

When the first identifier is used to identify the second device and the second network device, the second device obtains the network identifier of the corresponding virtual local area network, the encapsulation type corresponding to the first NVO3 tunnel, and a device identifier of the second network device from the first mapping relationship table based on the first identifier.

2042: The second device converts the format of the SRv6 packet based on the network identifier of the virtual local area network and the encapsulation type, to obtain the second packet.

In this step, as shown in FIG. 8 to FIG. 12, when the second device is a second GW, a second spine, or a second TOR, or when a second device is a second co-located device, the first NVO3 tunnel includes one tunnel segment. The second device removes the SRv6 header from the SRv6 packet to obtain the original packet, and adds a header corresponding to the first NVO3 tunnel (NVO32 shown in FIG. 8 to FIG. 12) to the original packet based on the encapsulation type to obtain the second packet, where the header includes the network identifier (the VNI shown in FIG. 8 to FIG. 12) of the virtual local area network.

Figure 16:
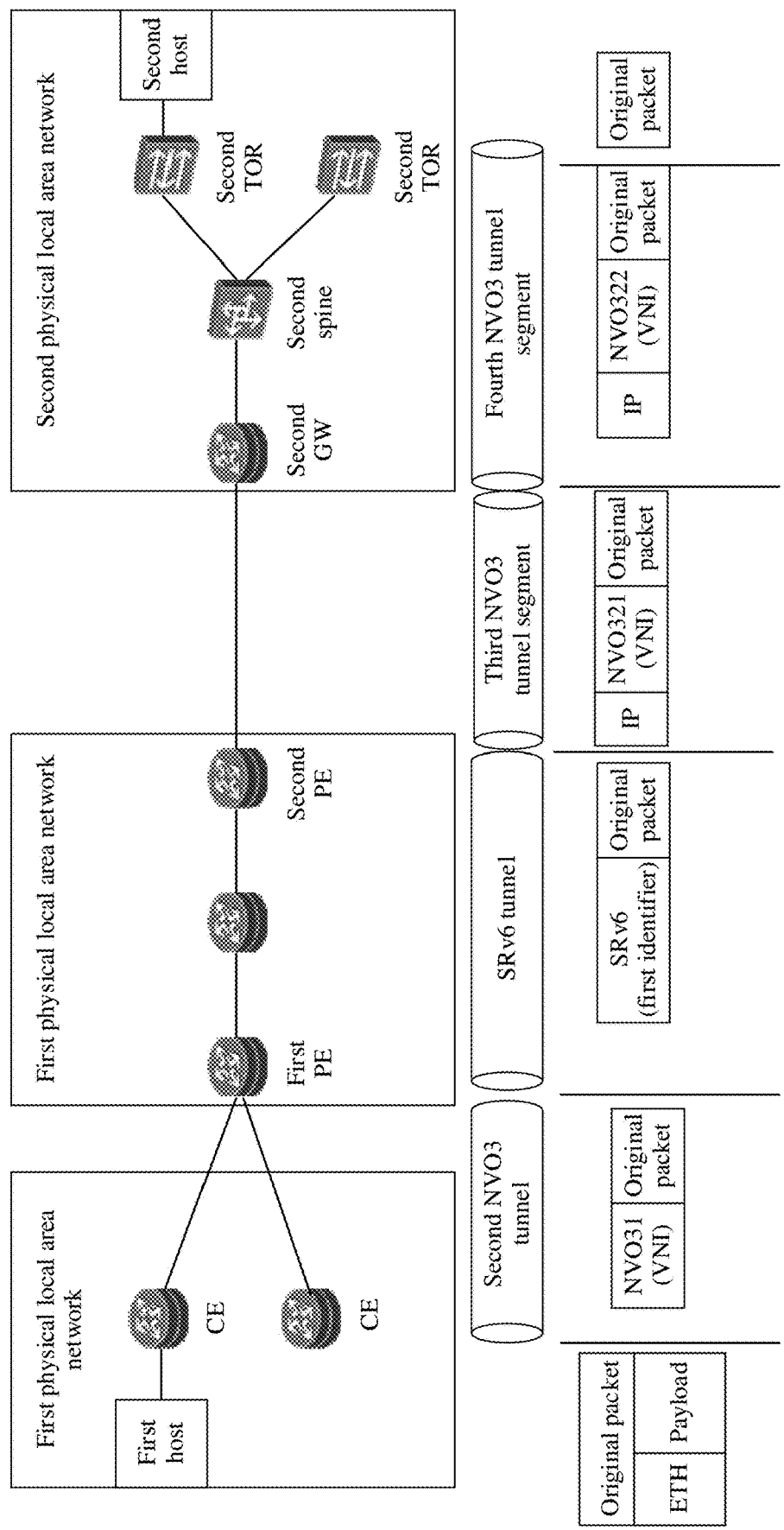
FIG. 16 is a schematic diagram of another example packet transmission process in the third network architecture according to an embodiment of this application.

As shown in FIG. 16, when the second device is a second PE, the first NVO3 tunnel includes a third NVO3 tunnel segment between the second device and a second GW and a fourth NVO3 tunnel segment between the second GW and the second network device, and the encapsulation type corresponding to the first NVO3 tunnel is an encapsulation type corresponding to the third NVO3 tunnel segment. The second device adds a header (NVO321 shown in FIG. 16) corresponding to the third NVO3 tunnel segment to the original packet based on the encapsulation type corresponding to the third NVO3 tunnel segment to obtain the second packet, where the header includes the network identifier (a VNI shown in FIG. 16) of the virtual local area network.

Optionally, as shown in FIG. 8 to FIG. 12 and FIG. 16, the second device may further add an IP header to an outer layer of an NVO3 header corresponding to the first NVO3 tunnel, where the IP header may include the identifier of the second network device. In other words, the second packet includes the IP header, the header corresponding to the first NVO3 tunnel, and the original packet.

Optionally, when the first packet further includes the first metadata, and a protocol type corresponding to the first NVO3 tunnel is a VXLAN-GPE encapsulation type or a GENEVE encapsulation type, the second device converts a format of the first metadata based on the protocol type corresponding to the first NVO3 tunnel and a field type of the first metadata included in the SRv6 packet, to obtain third metadata. Correspondingly, the second packet further includes the third metadata.

Optionally, the header corresponding to the first NVO3 tunnel further includes the third metadata.

Optionally, a process of converting the format of the first metadata may be as follows:

The SRv6 header includes the type field, the length field, and the content field. The second device obtains the first metadata included in the content field, the data type of the content field included in the type field, and the length that is of the first metadata in the content field and that is included in the length field. The second device obtains the protocol type corresponding to the first NVO3 tunnel.

The second device obtains a data type of a content field corresponding to the first NVO3 tunnel from the correspondence between a protocol type corresponding to an NVO3 tunnel, a data type of a content field corresponding to the NVO3 tunnel, and the data type of the content field corresponding to the SRv6 tunnel based on the data type of the content field corresponding to the first NVO3 tunnel and the protocol type corresponding to the first NVO3 tunnel, and specifies that the type field in the header corresponding to the first NVO3 tunnel includes the data type of the content field corresponding to the first NVO3 tunnel.

The second device obtains a length conversion rule and a format conversion rule corresponding to the content field corresponding to the first NVO3 tunnel from the correspondence between the protocol type corresponding to the NVO3 tunnel, a length conversion rule corresponding to the content field corresponding to the NVO3 tunnel, and a format conversion rule corresponding to the content field corresponding to the NVO3 tunnel based on the protocol type corresponding to the first NVO3 tunnel. The second device obtains a length of the third metadata according to the length conversion rule and the length of the first metadata, and specifies that the length field in the header corresponding to the first NVO3 tunnel includes the length of the third metadata. The second device converts the format of the first metadata according to the format conversion rule to obtain the third metadata, and specifies that the content field in the header corresponding to the first NVO3 tunnel includes the third metadata.

Step 205: The second device sends the second packet to the second host through the first NVO3 tunnel.

Optionally, when the second device is the second co-located device, the second GW, the second spine, or the second TOR, the second device may determine, based on the device identifier of the second network device and the network identifier of the virtual local area network, the first NVO3 tunnel that is between the second device and the second network device and that corresponds to the virtual local area network, and send the second packet to the second network device through the first NVO3 tunnel. The second network device receives the second packet, removes the IP header and the header corresponding to the first NVO3 tunnel from the second packet, to obtain the original packet, and sends the original packet to the second host based on the identifier of the second host included in the original packet.

Because the first NVO3 tunnel includes one tunnel segment, the packet format of the second packet is converted only once before the second network device receives the second packet. This reduces a quantity of times of packet format conversion, and improves efficiency of transmitting the second packet.

Optionally, with reference to FIG. 16, when the second device is the second PE, the first NVO3 tunnel includes the third NVO3 tunnel segment between the second device and the second GW and the fourth NVO3 tunnel segment between the second GW and the second network device. The second network device sends the second packet to the second GW through the third NVO3 tunnel segment. The second GW receives the second packet, reads the network identifier of the virtual local area network and the device identifier of the second network device from the second packet, and removes the IP header and a header corresponding to the third NVO3 tunnel segment from the second packet to obtain the original packet. The second GW determines, based on the network identifier of the virtual local area network, the fourth NVO3 tunnel segment that is between the second GW and the second network device and that corresponds to the virtual local area network, adds a header (NVO322 shown in FIG. 16) corresponding to the fourth NVO3 tunnel segment and an IP header to the original packet to obtain a fourth packet, and sends the fourth packet to the second network device through the fourth NVO3 tunnel segment, where the header corresponding to the fourth NVO3 tunnel segment includes the network identifier of the virtual local area network, and the IP header includes the device identifier of the second network device. The second network device receives the fourth packet, removes the IP header and the header corresponding to the fourth NVO3 tunnel segment from the fourth packet, to obtain the original packet, and sends the original packet to the second host based on the identifier of the second host included in the original packet.

In this embodiment, after receiving the first packet, the first network obtains the first identifier based on the identifier of the second host and the network identifier of the virtual local area network to which the second host belongs, where the identifier of the second host and the network identifier of the virtual local area network are included in the first packet, and the first identifier is used to identify the second device. In an SRv6 network, the first identifier used to identify the second device has a relatively long length. In addition to identifying the second device, the first identifier may be used to identify all existing virtual local area networks. The first identifier may be used to identify the virtual local area network to which the first host and the second host belong, and the first identifier includes an indication identifier. The indication identifier is used to indicate the second device to convert a format of a packet forwarded through the SRv6 tunnel into a format of a packet forwarded through the first NVO3 tunnel corresponding to the virtual local area network. The first packet is converted into the SRv6 packet. The SRv6 packet includes the first identifier and the original packet in the first packet, and the SRv6 packet is sent through the SRv6 tunnel between the first device and the second device. In this way, after receiving the SRv6 packet, the second device may obtain the network identifier of the virtual local area network based on the first identifier, determine the first NVO3 tunnel between the second device and the second network device, convert the first packet to obtain the second packet, and send the second packet to the second host through the first NVO3 tunnel, where the second packet includes the network identifier of the virtual local area network. The first identifier may be used to identify all the existing virtual local area networks, and when receiving the second packet, the second device may map different virtual local area networks based on the first identifier, and therefore the second device can successfully determine the first NVO3 tunnel, and send the second packet to the second host. In this way, for any virtual local area network, hosts in the virtual local area network but in different physical local area networks can communicate with each other.

Figure 17:
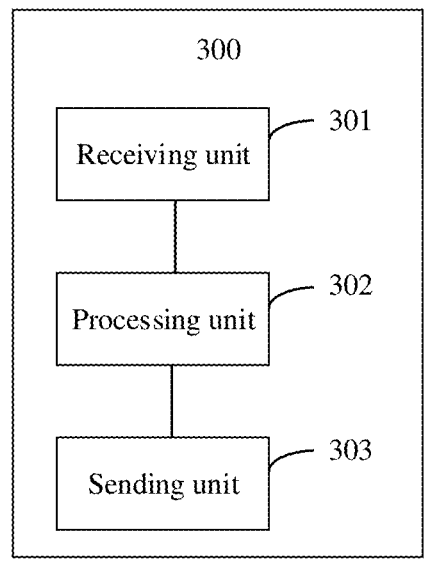
FIG. 17 is a schematic diagram of an example structure of a packet sending apparatus according to an embodiment of this application.

FIG. 17 shows a packet sending apparatus 300 according to an embodiment of this application. The apparatus 300 may be deployed on the first device in any one of the foregoing embodiments, for example, may be deployed on the first device in the embodiment shown in FIG. 6 or deployed on the first device in the embodiment shown in FIG. 7. The apparatus 300 includes:

a receiving unit 301, configured to receive a first packet, where the first packet includes a network identifier of a virtual local area network and an original packet, the original packet is a packet sent by a first host to a second host, and the virtual local area network includes the first host and the second host;

a processing unit 302, configured to obtain a first identifier based on an identifier of the second host and the network identifier, where the first identifier is used to identify a second device, an SRv6 tunnel exists between the apparatus 300 and the second device, the apparatus 300 is an ingress device for the SRv6 tunnel, a first NVO3 tunnel exists between the second device and a network device accessed by the second host, the first identifier includes an indication identifier, and the indication identifier is used to indicate the second device to convert a format of a packet forwarded through the SRv6 tunnel into a format of a packet forwarded through the first NVO3 tunnel; and a sending unit 303, configured to send an SRv6 packet to the second device through the SRv6 tunnel, where the SRv6 packet includes the first identifier and the original packet.

Optionally, for a detailed implementation process in which the processing unit 302 obtains the first identifier, refer to related content in which the first device obtains the first identifier in Step 202 in the embodiment shown in FIG. 7.

Optionally, the processing unit 302 is configured to:
  obtain a device identifier of the second device based on the identifier of the second host and the network identifier; and
  obtain the first identifier from a mapping relationship table based on the network identifier and the device identifier, where the mapping relationship table is used to store a correspondence between a network identifier, a device identifier, and the first identifier.

Optionally, for a detailed implementation process in which the processing unit 302 obtains the first identifier from the mapping relationship table, refer to related content in which the first device obtains the first identifier in Step 2021 to Step 2023 in the embodiment shown in FIG. 7.

Optionally, the first identifier is further used to identify the network device accessed by the second host. The processing unit 302 is configured to: obtain a device identifier of the second device based on the identifier of the second host and the network identifier; and obtain the first identifier from a mapping relationship table based on the network identifier, the device identifier, and the identifier of the second host, where the mapping relationship table is used to store a correspondence between a network identifier, a device identifier, an identifier of a host, and the first identifier.

Optionally, the processing unit 302 is further configured to:
  obtain first metadata, where the first metadata includes at least one of additional information of the original packet or device information of a network device through which the original packet passes.

Optionally, the first packet further includes second metadata, and the processing unit 302 is configured to:
convert a format of the second metadata based on a protocol type corresponding to a second NVO3 tunnel and a field type of the second metadata included in the first packet, to obtain the first metadata, where the second NVO3 tunnel is a tunnel between the apparatus 300 and a network device accessed by the first host.

Optionally, for a detailed implementation process in which the processing unit 302 converts the format of the second metadata, refer to related content in which the first device converts the format of the second metadata by the processing unit 302 in the embodiment shown in FIG. 7.

Optionally, a segment list field in the SRv6 packet includes the first identifier.

Optionally, the first identifier is a segment identifier (SID).

Optionally, the receiving unit 301 is further configured to receive a notification packet sent by the second device, where the notification packet includes the first identifier, the network identifier, and the device identifier.

The processing unit 302 is further configured to store a correspondence between the first identifier, the network identifier, and the device identifier in the mapping relationship table.

Optionally, for a detailed implementation process in which the processing unit 302 stores the correspondence in the mapping relationship table, refer to related content in which the first device performs the operation in Step 105 in the embodiment shown in FIG. 6.

Optionally, the second device is an edge router (PE), a gateway (GW), a co-located device, a spine switch (Spine), or a leaf switch (TOR) connected to the second host, and the co-located device includes a function of the PE and a function of the GW.

Optionally, the apparatus 300 is a PE, a GW, a co-located device, a spine, or a TOR connected to the first host, and the co-located device includes a function of the PE and a function of the GW.

In this embodiment, the receiving unit receives the first packet, and the processing unit obtains the first identifier based on the identifier of the second host and the network identifier. The first identifier is used to identify the second device, and is used to indicate the second device to convert the format of the packet forwarded through the SRv6 tunnel into the format of the packet forwarded through the first NVO3 tunnel in the virtual local area network. Therefore, the virtual local area network is a virtual local area network to which the first host and the second host belong and that is identified by the first identifier. The SRv6 packet sent by the sending unit to the second device includes the first identifier. Therefore, the second device may convert, based on the first identifier in the SRv6 packet, a format of the SRv6 packet into a format of the packet forwarded through the first NVO3 tunnel, to obtain the second packet corresponding to the first NVO3 tunnel. The first NVO3 tunnel is an NVO3 tunnel corresponding to the virtual local area network. The second device sends the second packet to the second host through the first NVO3 tunnel corresponding to the virtual local area network. In this way, the first host and the second host located in the same virtual local area network but in different physical local areas can perform normal communication. This can ensure normal communication between hosts located in a same virtual local area network but in different physical local area networks. In addition, the processing unit converts the format of the second metadata based on the protocol type corresponding to the second NVO3 tunnel and the field type of the second metadata included in the first packet, to obtain the first metadata. In this way, the first metadata may be added to the SRv6 packet, to avoid metadata loss.

Figure 18:
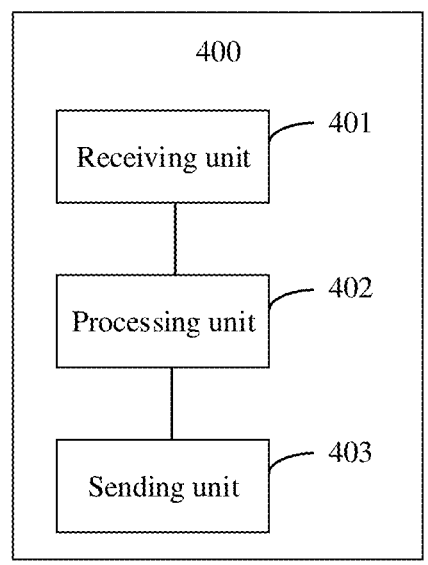
FIG. 18 is a schematic diagram of an example structure of another packet sending apparatus according to an embodiment of this application.

FIG. 18 shows a packet sending apparatus 400 according to an embodiment of this application. The apparatus 400 may be deployed on the second device in any one of the foregoing embodiments, for example, may be deployed on the second device in the embodiment shown in FIG. 6 or deployed on the second device in the embodiment shown in FIG. 7. The apparatus 400 includes:

a receiving unit 401, configured to receive an SRv6 packet through an SRv6 tunnel between the receiving unit 401 and a first device, where the first device is an ingress device for the SRv6 tunnel, the SRv6 packet includes a first identifier and an original packet, the original packet is a packet sent by a first host to a second host, the first identifier is used to identify the apparatus 400, a first NVO3 tunnel exists between the apparatus 400 and a network device accessed by the second host, and the first identifier includes an indication identifier;

a processing unit 402, configured to convert the SRv6 packet into a second packet based on the first identifier, where the second packet includes a network identifier of a virtual local area network and the original packet, and the virtual local area network includes the first host and the second host; and a sending unit 403, configured to send the second packet to the second host through the first NVO3 tunnel.

Optionally, for a detailed implementation process in which the processing unit 402 converts the SRv6 packet into the second packet, refer to related content in which the second device converts the SRv6 packet in Step 204 in the embodiment shown in FIG. 7.

Optionally, the processing unit 402 is configured to:
obtain the network identifier of the virtual local area network and an encapsulation type of the first NVO3 tunnel from a mapping relationship table based on the first identifier, where the mapping relationship table is used to store a correspondence between the first identifier, a network identifier, and an encapsulation type; and
convert a format of the SRv6 packet based on the network identifier of the virtual local area network and the encapsulation type, to obtain the second packet.

Optionally, for a detailed implementation process in which the processing unit 402 obtains the network identifier and the encapsulation type from the mapping relationship table to convert the SRv6 packet, refer to related content in which the second device performs the operation in Step 2041 and Step 2042 in the embodiment shown in FIG. 7.

Optionally, the SRv6 packet further includes first metadata, the first metadata includes at least one of additional information of the original packet or device information of a network device through which the original packet passes, and the second packet further includes third metadata.

The processing unit 402 is further configured to convert a format of the first metadata based on a protocol type corresponding to the first NVO3 tunnel and a field type of the first metadata included in the SRv6 packet, to obtain the third metadata.

Optionally, for a detailed implementation process in which the processing unit 402 converts the format of the first metadata, refer to related content in which the second device converts the format of the first metadata in Step 204 in the embodiment shown in FIG. 7.

Optionally, the first identifier is further used to identify the network device accessed by the second host, and the second packet further includes a device identifier of the network device accessed by the second host.

Optionally, the first identifier is an SID.

Optionally, the processing unit 402 is further configured to send a notification packet to the first device, where the notification packet includes the first identifier, a device identifier of the apparatus 400, and the network identifier of the virtual local area network.

Optionally, for a detailed implementation process in which the processing unit 402 sends the notification packet, refer to the detailed implementation process in which the second device sends the notification packet in Step 103 and Step 104 in the embodiment shown in FIG. 6.

Optionally, the apparatus 400 is a PE, a GW, a co-located device, a spine, or a TOR connected to the second host, and the co-located device includes a function of the PE and a function of the GW.

Optionally, the first device is a PE, a GW, a co-located device, a spine, or a TOR connected to the first host, and the co-located device includes a function of the PE and a function of the GW.

In this embodiment, the receiving unit receives the SRv6 packet through the SRv6 tunnel between the receiving unit and the first device, where the SRv6 packet includes the first identifier and the original packet. The first identifier is used to identify the apparatus 400, where a length of the first identifier used to identify the apparatus 400 is relatively long; and may further be used to identify that the first host and the second host belong to the virtual local area network. Therefore, the first identifier can be used to indicate the apparatus 400 to convert the format of the packet forwarded through the SRv6 tunnel into the format of the packet forwarded through the first NVO3 tunnel corresponding to the virtual local area network. In this way, the processing unit may convert, based on the first identifier in the SRv6 packet, the format of the SRv6 packet into the format of the packet forwarded through the first NVO3 tunnel, to obtain the second packet corresponding to the first NVO3 tunnel. The first NVO3 tunnel is an NVO3 tunnel corresponding to the virtual local area network. The sending unit sends the second packet to the second host through the first NVO3 tunnel corresponding to the virtual local area network. In this way, the first host and the second host located in the same virtual local area network but in different physical local areas can perform normal communication. This can ensure normal communication between hosts located in a same virtual local area network but in different physical local area networks. In addition, the processing unit converts the format of the first metadata based on the protocol type corresponding to the first NVO3 tunnel and the field type of the first metadata included in the SRv6 packet, to obtain the third metadata. In this way, the third metadata may be added to the second packet, to avoid metadata loss.

Figure 19:
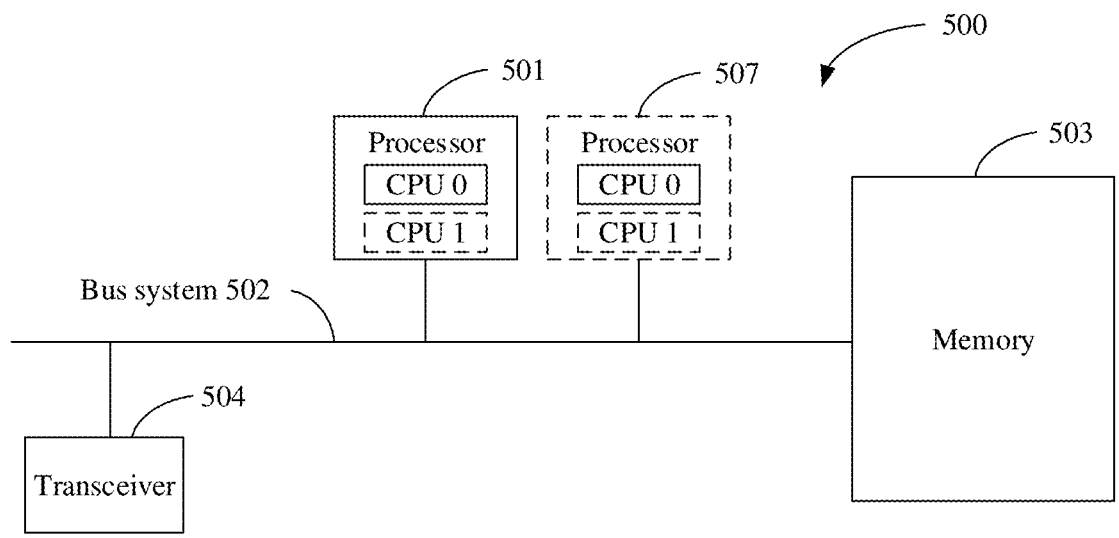
FIG. 19 is a schematic diagram of an example structure of another packet sending apparatus according to an embodiment of this application.

FIG. 19 is a schematic diagram of a packet sending apparatus 500 according to an embodiment of this application. The apparatus 500 may be the first device in any one of the foregoing embodiments, for example, may be the first device in the embodiment shown in FIG. 6 or the first device in the embodiment shown in FIG. 7. The apparatus 500 includes at least one processor 501, a bus system 502, a memory 503, and at least one transceiver 504.

The apparatus 500 is an apparatus of a hardware structure, and can be configured to implement the function modules in the apparatus 300 shown in FIG. 17. For example, a person skilled in the art may determine that the processing unit 302 in the apparatus 300 shown in FIG. 17 may be implemented by the at least one processor 501 by invoking code in the memory 503, and the receiving unit 301 and the sending unit 303 in the apparatus 300 shown in FIG. 17 may be implemented by the transceiver 504.

Optionally, the apparatus 500 may further be configured to implement a function of the collection analysis device in any one of the foregoing embodiments.

Optionally, the processor 501 may be a general-purpose central processing unit (CPU), a network processor (NP), a microprocessor, an application-specific integrated circuit (ASIC), or one or more integrated circuits configured to control program execution of the solutions of this application.

The bus system 502 may include a path for transmitting information between the foregoing components.

The transceiver 504 is configured to communicate with another device or a communications network.

The memory 503 may be a read-only memory (ROM) or another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in an instruction form or a data structure form and that can be accessed by a computer, but is not limited thereto. The memory may exist independently, and is connected to the processor through the bus. The memory may alternatively be integrated with the processor.

The memory 503 is configured to store application program code for performing the solutions of this application, and the processor 501 controls the execution. The processor 501 is configured to execute the application program code stored in the memory 503, to implement functions in the method in this patent.

In an embodiment, the processor 501 may include one or more CPUs, for example, a CPU 0 and a CPU 1 in FIG. 19.

In an embodiment, the apparatus 500 may include a plurality of processors, for example, the processor 501 and a processor 507 shown in FIG. 19. Each of the processors may be a single-core (single-CPU) processor, or may be a multi-core (multi-CPU) processor. The processor herein may be one or more devices, circuits, and/or processing cores for processing data (such as a computer program instruction).

Figure 20:
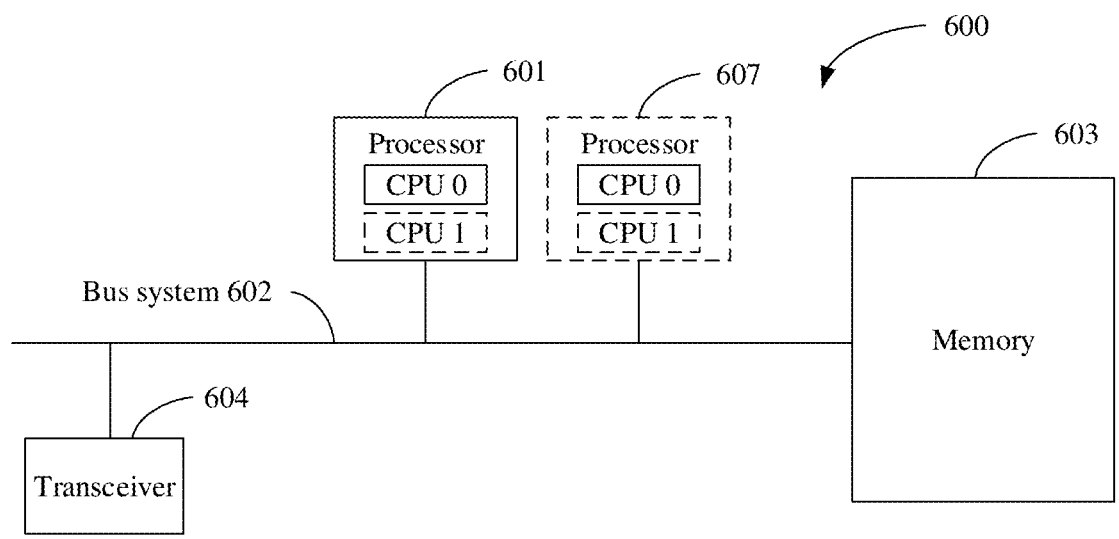
FIG. 20 is a schematic diagram of an example structure of another packet sending apparatus according to an embodiment of this application.

FIG. 20 is a schematic diagram of a packet sending apparatus 600 according to an embodiment of this application. The apparatus 600 may be the second device in any one of the foregoing embodiments, for example, may be the second device in the embodiment shown in FIG. 6 or the second device in the embodiment shown in FIG. 7. The apparatus 600 includes at least one processor 601, a bus system 602, a memory 603, and at least one transceiver 604.

The apparatus 600 is an apparatus of a hardware structure, and can be configured to implement the function modules in the apparatus 400 shown in FIG. 18. For example, a person skilled in the art may figure out that the processing unit 402 in the apparatus 400 shown in FIG. 18 may be implemented by the at least one processor 601 by invoking code in the memory 603, and the receiving unit 401 and the sending unit 403 in the apparatus 400 shown in FIG. 18 may be implemented by the transceiver 604.

Optionally, the apparatus 600 may further be configured to implement a function of the collection analysis device in any one of the foregoing embodiments.

Optionally, the processor 601 may be a general-purpose central processing unit (CPU), a network processor (NP), a microprocessor, an application-specific integrated circuit (ASIC), or one or more integrated circuits configured to control program execution of the solutions of this application.

The bus system 602 may include a path for transmitting information between the foregoing components.

The transceiver 604 is configured to communicate with another device or a communications network.

The memory 603 may be a read-only memory (ROM) or another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in an instruction form or a data structure form and that can be accessed by a computer, but is not limited thereto. The memory may exist independently, and is connected to the processor through the bus. The memory may alternatively be integrated with the processor.

The memory 603 is configured to store application program code for performing the solutions of this application, and the processor 601 controls the execution. The processor 601 is configured to execute the application program code stored in the memory 603, to implement functions in the method in this patent.

In an embodiment, the processor 601 may include one or more CPUs, for example, a CPU 0 and a CPU 1 in FIG. 20.

In an embodiment, the apparatus 600 may include a plurality of processors, for example, the processor 601 and a processor 607 shown in FIG. 20. Each of the processors may be a single-core (single-CPU) processor, or may be a multi-core (multi-CPU) processor. The processor herein may be one or more devices, circuits, and/or processing cores for processing data (such as a computer program instruction).

Figure 21:
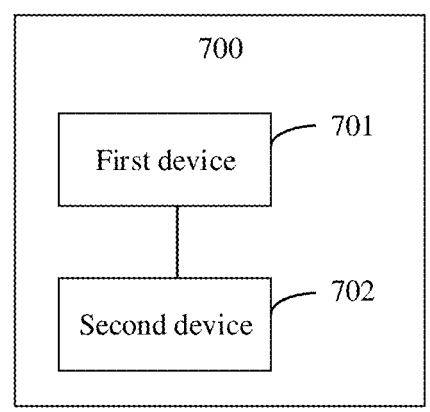
FIG. 21 is a schematic diagram of an example structure of a packet sending system according to an embodiment of this application.

FIG. 21 shows a packet sending system 700 according to an embodiment of this application. The system 700 includes the apparatus 300 shown in FIG. 17 and the apparatus 400 shown in FIG. 18, or the system 700 includes the apparatus 500 shown in FIG. 19 and the apparatus 600 shown in FIG. 20.

Optionally, as shown in FIG. 21, the apparatus 300 in FIG. 17 or the apparatus 500 in FIG. 19 may be a first device 701, and the apparatus 400 in FIG. 19 or the apparatus 600 in FIG. 20 may be a second device 702. For example, the apparatus 300 shown in FIG. 17 or the apparatus 500 shown in FIG. 19 may be the first device in the embodiment shown in FIG. 6 or the first device in the embodiment shown in FIG. 7. The apparatus 400 shown in FIG. 18 or the apparatus 600 shown in FIG. 20 may be the second device in the embodiment shown in FIG. 6 or the second device in the embodiment shown in FIG. 7.

Optionally, the system may further include at least one of a first host, a second host, a network device accessed by the first host, or a network device accessed by the second host.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing description is merely an embodiment of this application, but is not intended to limit this application. Any modification, equivalent replacement, or improvement made without departing from the principle of this application should fall within the protection scope of this application.

What is claimed is:

1. A first device comprising:
   at least one processor;
   one or more memories coupled to the at least one processor and storing instructions that, when executed by the at least one processor, cause the first device to:
   receive a first packet, wherein the first packet comprises a network identifier of a virtual local area network and an original packet, the original packet is sent by a first host to a second host, and the virtual local area network comprises the first host and the second host;
   obtain a first identifier based on an identifier of the second host and the network identifier, wherein the first identifier identifies a second device, a segment routing over internet protocol version 6 (SRv6) tunnel exists between the first device and the second device, the first device is an ingress device for the SRv6 tunnel, a first network virtualization over layer 3 (NVO3) tunnel exists between the second device and a network device accessed by the second host, the first identifier comprises an indication identifier indicating the second device to convert a format of a packet forwarded through the SRv6 tunnel into a format of a packet forwarded through the first NVO3 tunnel; and
   send an SRv6 packet to the second device through the SRv6 tunnel, wherein the SRv6 packet comprises the first identifier and the original packet.

2. The first device according to claim 1, wherein the instructions, when executed by the at least one processor, further cause the first device to:
   obtain a device identifier of the second device based on the identifier of the second host and the network identifier; and
   obtain the first identifier from a mapping relationship table based on the network identifier and the device identifier, wherein the mapping relationship table stores a correspondence between a network identifier, a device identifier, and the first identifier.

3. The first device according to claim 1, wherein the first identifier further identifies the network device accessed by the second host, and the instructions, when executed by the at least one processor, further cause the first device to:
   obtain a device identifier of the second device based on the identifier of the second host and the network identifier; and
   obtain the first identifier from a mapping relationship table based on the network identifier, the device identifier, and the identifier of the second host, wherein the mapping relationship table stores a correspondence between a network identifier, a device identifier, an identifier of a host, and the first identifier.

4. The first device according to claim 1, wherein the SRv6 packet further comprises first metadata, and the instructions, when executed by the at least one processor, further cause the first device to:
  obtain the first metadata, wherein the first metadata comprises at least one of additional information of the original packet or device information of a network device through which the original packet passes.

5. The first device according to claim 4, wherein the first packet further comprises second metadata, and the instructions, when executed by the at least one processor, further cause the first device to:
  converting a format of the second metadata based on a protocol type corresponding to a second NVO3 tunnel and a field type of the second metadata comprised in the first packet, to obtain the first metadata, wherein the second NVO3 tunnel is a tunnel between the first device and a network device accessed by the first host.

6. The first device according to claim 1, wherein a segment list field in the SRv6 packet comprises the first identifier.

7. The first device according to claim 2, wherein the instructions, when executed by the at least one processor, further cause the first device to:
  receive a notification packet sent by the second device, wherein the notification packet comprises the first identifier, the network identifier, and the device identifier; and
  store a correspondence between the first identifier, the network identifier, and the device identifier in the mapping relationship table.

8. The first device according to claim 1, wherein the second device is an edge router (PE), a gateway (GW), a co-located device, a spine switch (Spine), or a leaf switch (TOR) connected to the second host, and the co-located device comprises a function of the PE and a function of the GW.

9. The first device according to claim 1, wherein the first device is a PE, a GW, a co-located device, a spine, or a TOR connected to the first host, and the co-located device comprises a function of a PE and a function of a GW.

10. A second device comprising:
  at least one processor;
  one or more memories coupled to the at least one processor and storing instructions that, when executed by the at least one processor, cause the second device to:
  receive a segment routing over internet protocol version 6 (SRv6) packet through a SRv6 tunnel between the second device and a first device, wherein the first device is an ingress device for the SRv6 tunnel, the SRv6 packet comprises a first identifier and an original packet, the original packet is sent by a first host to a second host, the first identifier identifies the second device, a first network virtualization over layer 3 (NVO3) tunnel exists between the second device and a network device accessed by the second host, and the first identifier comprises an indication identifier indicating to convert a format of a packet so that the packet can be transmitted via the first NVO3 tunnel;
  convert the SRv6 packet into a second packet based on the first identifier, wherein the second packet is a packet forwarded through the first NVO3 tunnel, the second packet comprises a network identifier of a virtual local area network and the original packet, and the virtual local area network comprises the first host and the second host; and
  send the second packet to the second host through the first NVO3 tunnel.

11. The second device according to claim 10, wherein the instructions, when executed by the at least one processor, further cause the second device to:
  obtain, by the second device, the network identifier of the virtual local area network and an encapsulation type of the first NVO3 tunnel from a mapping relationship table based on the first identifier, wherein the mapping relationship table stores a correspondence between the first identifier, a network identifier, and an encapsulation type; and
  convert, by the second device, a format of the SRv6 packet based on the network identifier of the virtual local area network and the encapsulation type, to obtain the second packet.

12. The second device according to claim 10, wherein the SRv6 packet further comprises first metadata, the first metadata comprises at least one of additional information of the original packet or device information of a network device through which the original packet passes, and the second packet further comprises third metadata; and
  the instructions, when executed by the at least one processor, further cause the second device to:
  convert a format of the first metadata based on a protocol type corresponding to the first NVO3 tunnel and a field type of the first metadata comprised in the SRv6 packet, to obtain the third metadata.

13. The second device according to claim 10, wherein the first identifier further identifies the network device accessed by the second host, and the second packet further comprises a device identifier of the network device accessed by the second host.

14. The second device according to claim 10, wherein the first identifier is a segment identifier (SID).

15. The second device according to claim 10, wherein the instructions, when executed by the at least one processor, further cause the second device to:
  send a notification packet to the first device, wherein the notification packet comprises the first identifier, a device identifier of the second device, and the network identifier of the virtual local area network.

16. The second device according to claim 10, wherein the second device is an edge router (PE), a gateway (GW), a co-located device, a spine switch (Spine), or a leaf switch (TOR) connected to the second host, and the co-located device comprises a function of a PE and a function of a GW.

17. The second device according to claim 10, wherein the first device is a PE, a GW, a co-located device, a spine, or a TOR connected to the first host, and the co-located device comprises a function of a PE and a function of a GW.

18. A network system comprising a first device and a second device,
  wherein the first device is configured to:
  receive a first packet, wherein the first packet comprises a network identifier of a virtual local area network and an original packet, the original packet is sent by a first host to a second host, and the virtual local area network comprises the first host and the second host;
  obtain a first identifier based on an identifier of the second host and the network identifier, wherein the first identifier identifies a second device, a segment routing over internet protocol version 6 (SRv6) tunnel exists between the first device and the second device, the first device is an ingress device for the SRv6 tunnel, a first network virtualization over layer 3 (NVO3) tunnel exists between the second device and a network device accessed by the second host, the first identifier comprises an indication identifier indicating the second device to convert a format of a packet forwarded through the SRv6 tunnel into a format of a packet forwarded through the first NVO3 tunnel; and send an SRv6 packet to the second device through the SRv6 tunnel, wherein the SRv6 packet comprises the first identifier and the original packet;

and the second device is configured to:

receive the SRv6 packet;

convert the SRv6 packet into a second packet based on the first identifier, wherein the second packet is a packet forwarded through the first NVO3 tunnel, the second packet comprises the network identifier of the virtual local area network and the original packet; and send the second packet to the second host through the first NVO3 tunnel.

19. The network system according to claim 18, wherein the first identifier is a segment identifier (SID).

20. The network system according to claim 18, wherein a segment list field in the SRv6 packet comprises the first identifier.

* * * * *